United States Patent
Schallek et al.

(10) Patent No.: US 10,803,601 B2
(45) Date of Patent: Oct. 13, 2020

(54) RAPID ASSESSMENT AND VISUAL REPORTING OF LOCAL PARTICLE VELOCITY

(71) Applicants: Jesse Schallek, Rush, NY (US); Keith Parkins, Rochester, NY (US); Aby Joseph, Rochester, NY (US)

(72) Inventors: Jesse Schallek, Rush, NY (US); Keith Parkins, Rochester, NY (US); Aby Joseph, Rochester, NY (US)

(73) Assignee: University of Rochester, Rochester, NY (US)

( * ) Notice: Subject to any disclaimer, the term of this patent is extended or adjusted under 35 U.S.C. 154(b) by 76 days.

(21) Appl. No.: 16/157,531

(22) Filed: Oct. 11, 2018

(65) Prior Publication Data

US 2019/0114790 A1 Apr. 18, 2019

Related U.S. Application Data

(60) Provisional application No. 62/572,071, filed on Oct. 13, 2017.

(51) Int. Cl.
*G06T 7/00* (2017.01)
*G06T 7/246* (2017.01)
(Continued)

(52) U.S. Cl.
CPC .......... *G06T 7/248* (2017.01); *G06K 9/0014* (2013.01); *G06K 9/46* (2013.01); *G06T 1/20* (2013.01);
(Continued)

(58) Field of Classification Search
CPC ......... G06T 7/248; G06T 1/20; G06K 9/0014; G06K 2209/01; G06K 2207/30041; G06K 2007/30101
See application file for complete search history.

(56) References Cited

U.S. PATENT DOCUMENTS

2010/0104168 A1* 4/2010 Dobbe ............... G06T 7/60
382/134
2013/0089258 A1* 4/2013 Herling ............ G06K 9/00771
382/173
(Continued)

FOREIGN PATENT DOCUMENTS

WO WO-9824065 A1 * 6/1998 ......... G01S 7/52087
WO WO-2010047191 A1 * 4/2010 ......... G01N 15/1463

OTHER PUBLICATIONS

Aithal, P., et al., "A Fast and Novel Skew Estimation Approach Using Radon Transform," 2013, International Journal of Computer Information Systems and Industrial Management Applications, vol. 5 (pp. 337-344).

(Continued)

*Primary Examiner* — Khai M Nguyen
(74) *Attorney, Agent, or Firm* — Harris Beach PLLC

(57) ABSTRACT

An image processing method for determining and reporting a velocity of a plurality of objects in a space-time image includes: providing an imager to acquire a plurality of images of a line; receiving a plurality of images; generating a space-time image from the plurality of images of the line; applying a mask to a subset image of the space-time image to provide a masked subset area; generating a rotational look up table of intensity values of pixels of columns and rows of the masked subset area; generating a radon transform for each subset image; computing a velocity of a plurality of objects in the subset image based on the radon transform; repeating the step of applying a mask to the step of computing a velocity; and displaying the velocity of a plurality of objects overlaying the space-time image substantially in real-time as the plurality of images are acquired.

21 Claims, 21 Drawing Sheets
(14 of 21 Drawing Sheet(s) Filed in Color)

(51) Int. Cl.
 G06T 1/20 (2006.01)
 G06K 9/46 (2006.01)
 G06K 9/00 (2006.01)
(52) U.S. Cl.
 CPC ............... G06K 2209/01 (2013.01); G06T 2207/30041 (2013.01); G06T 2207/30101 (2013.01)

(56) References Cited

U.S. PATENT DOCUMENTS

2014/0063458 A1* 3/2014 Imamura ............ A61B 3/14 351/206
2014/0354794 A1* 12/2014 Imamura ............ A61B 5/0285 348/78

OTHER PUBLICATIONS

Clode, S. P., et al., "A Phase Coded Disk Approach to Thick Curvilinear Line Detection," 2004, Proc. 7th Eur. Signal Processing Conf., Vienna, Austria (pp. 1147-1150).
Copeland, A.C., et al., "Localized Radon Transform-Based Detection of Ship Wakes in SAR Images," 1995, IEEE Transactions on Geoscience and Remote Sensing, vol. 33, No. 1 (pp. 35-45).
Deans, Stanley R., "The Radon transform and some of its applications," Courier Corporation, 2007 (pp. 1-50).
Drew, Patrick, J., et al., "Rapid determination of particle velocity from space-time images using the Radon transform," 2009, Journal of Computational Neuroscience, vol. 29 (8 pgs).
Duda, Richard O., et al., "Use of the Hough Transformation to Detect Lines and Curves in Pictures," 1972, Communications of the ACM, vol. 15, No. 1 (pp. 11-15).
Jafari-Khouzani, K., et al., "Radon Transform Orientation Estimation for Rotation Invariant Texture Analysis," 2005, IEEE Transactions on Pattern Analysis and Machine Intelligence, vol. 27, No. 6 (pp. 1004-1008).
Khidir, AbdulSattar, "Use of Radon Transform in Orientation Estimation of Printed Text," 2011, IEEE Computer Society (5 pgs).
Kim, T. N., et al., "Line-Scanning Particle Image Velocimetry: An Optical Approach for Quantifying a Wide Range of Blood Flow Speeds in Live Animals," 2012, PLoS ONE, No. 6 (13 pgs).
Leavers, Violet F., "Use of the Two-Dimensional Radon Transform to Generate a Taxonomy of Shape for the Chartacterization of Abrasive Powder Particles," 2000, IEEE Transactions on Pattern Analysis and Machine Intelligence, vol. 22, No. 12 (pp. 1411-1423).
Murphy, Lesley M., "Linear feature detection and enhancement in noisy images via the Radon transform," 1986, Pattern Recognition Letters, vol. 4 (pp. 279-284).
Natterer, Frank, "The mathematics of computerized tomography," Society for Industrial and Applied Mathematics, 2001 (Chps. 1 and 2).
Yilmaz, Oz, Seismic data analysis: Processing, inversion, and interpretation of seismc data, Society of exploration geophysicists, 2001 (Chp. 6).
Zhang, Q., et al., "Comparing Different Localization Approaches of the Radon Transform for Road Centerline Extraction from Classified Satellite Imagery," 2006, the 18th International Confernece on Pattern Recognition (4 pgs).
Zhong, Z., et al., In vivo measurement of erythrocyte velocity and retinal blood flow using adaptive optics scanning laser opthalmoscopy, 2008, Optics Express, vol. 16, No. 17 (pp. 12746-12756).
Zhong, Z., et al., "Local flicker stimulation evokes local retinal blood velocity changes," 2012, Journal of Vision, vol. 12 (8 pgs).
Zhong, Z., et al., "Noninvasive measurements and Analysis of Blood Velocity Profiles in Human Retinal Vessels," 2011, Investigative Ophthalmology & Visual Science, vol. 52, No. 7 (pp. 4151-4157).

* cited by examiner

FIG. 5

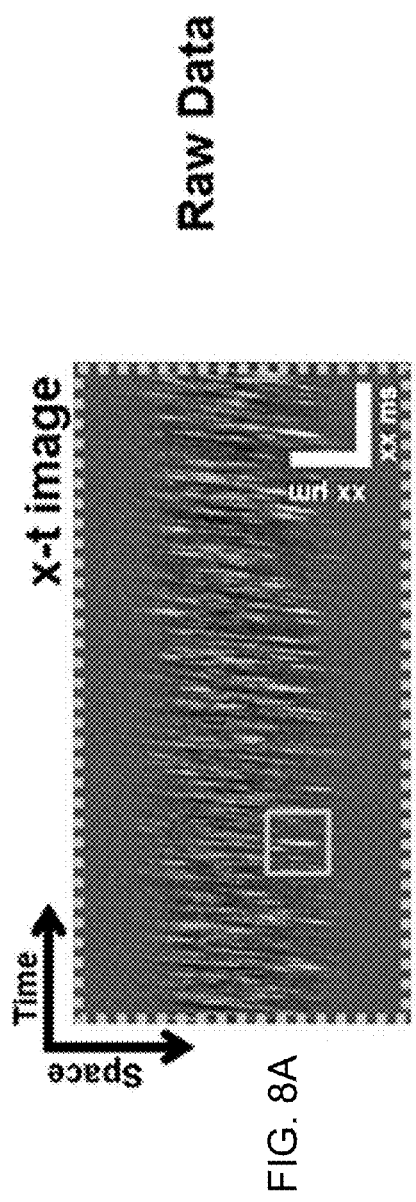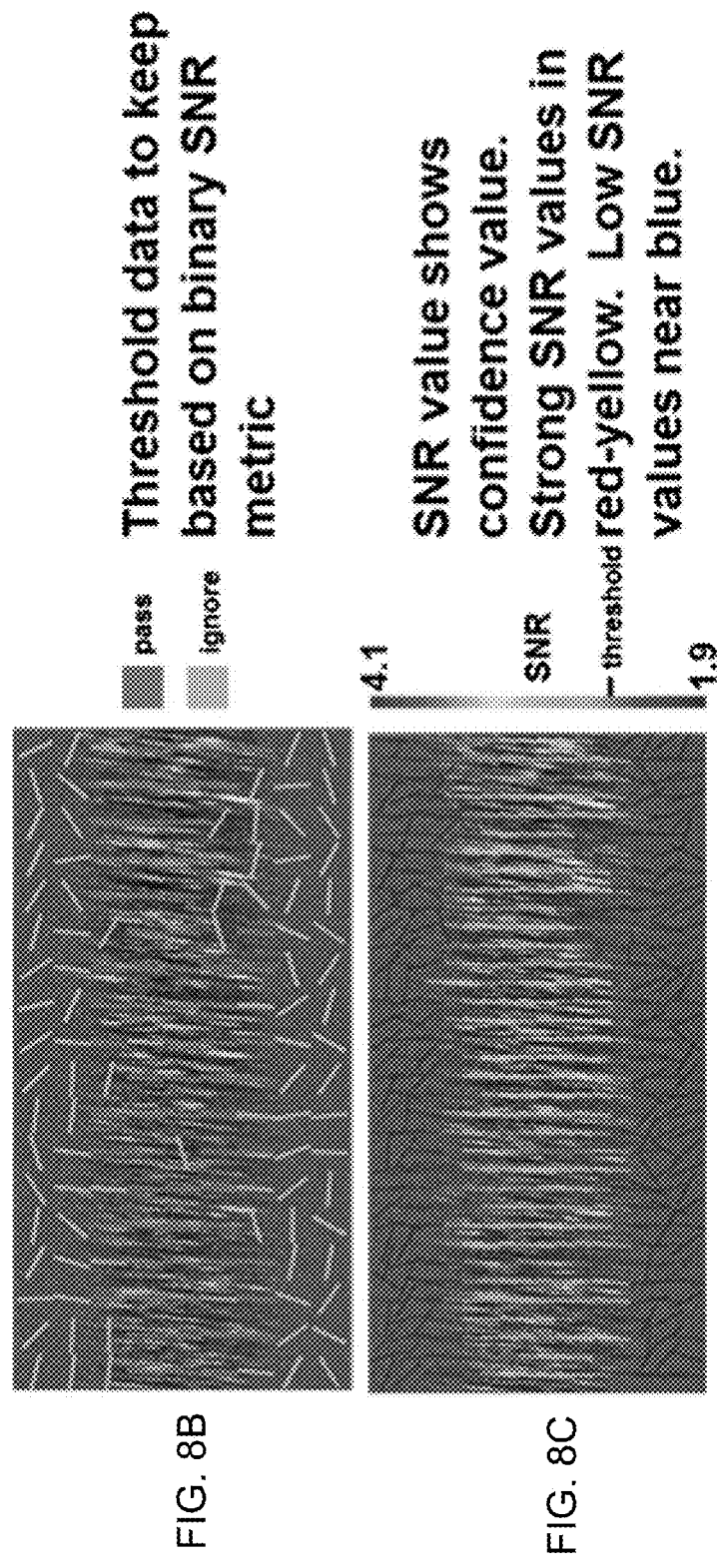
FIG. 8A  FIG. 8B  FIG. 8C

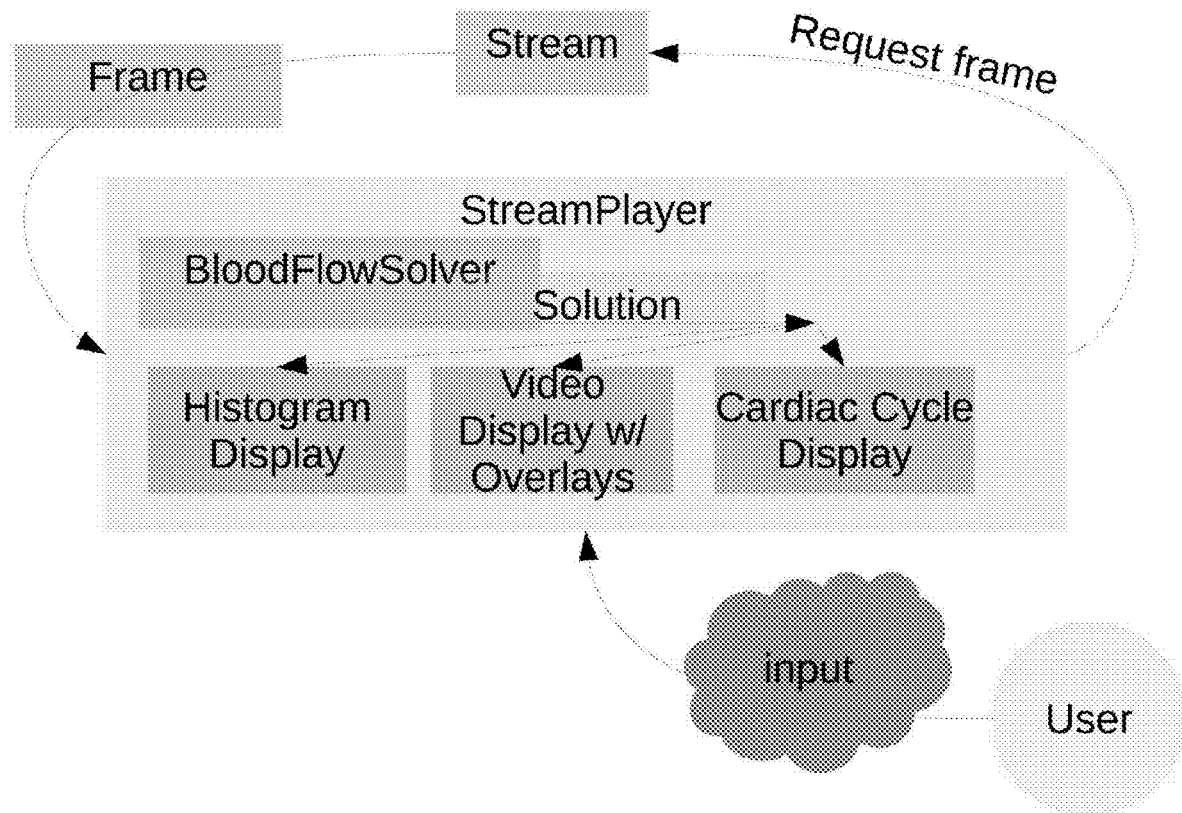

```
main event loop:

user input -> Streamplayer::setStream (Network|Video)

if (stream is raster scan stream):
    User input -> Streamplayer::setRegionOfInterest(ROI)

OnBeginProcessing:
    Parameters = StreamPlayer::getCurrentParameters()

while( (Frame = Stream::nextFrame()) != empty and notStopped):

Solution = BloodFlowSolver::solve(Frame, Parameters)

for_each (Display in HistogramWnd, VideoOverlayWnd,
                                                    CardiacWnd)
            Display::show(Solution)
        End_foreach
    End while
DoneProcessing
```

FIG. 19

```
BloodFlowSolver

Solution = solve(Frame, Parameters)
    RadonTable = buildRadonLookupTable(KernelShape, AnglesToTest)
```

```
Struct Parameters {
    AnglesToTest, KernelShape, KernelLocations, . . .
}

Solution = BloodFlowSolver::solve(Frame, Parameters):

FilteredFrame = removeNoise(Frame)

NumThreads = getOptimalThreadCount(GetNumCores())

if (RadonTableNeedsUpdating())

RadonTable = buildRadonLookupTable(KernelShape, AnglesToTest):

Center, Radius = GetLongestCrossingSegment(KernelShape)

RadonTable.dimensions =
                     GetSquareCircumscribedAbout(Center,Radius);

RadonTable::allocateRotationFrames()

Parallel(NumThreads)::foreach(angle in AnglesToTest):

foreach(pixel in RadonTable.RotationFrame[angle])
                    if (isOutsideKernel(pixel)) pixel = [0,0]
                    pixel.RotateTo =
                        getRotationCoords(angle, pixel.location)
                End_foreach
            End_foreach
        EndBuildRadonLookupTable DispatchTable = buildDispatchTable(NumThreads, KernelLocations)

Solution.KernelResults[] = allocateMemory(KernelLocations)

Parallel(NumThreads)::foreach(location in DispatchTable)

Solution.KernelResults[locations] =
                    solveRadon(location, FilteredFrame, RadonTable)

End_foreach
    buildReport(Solution)

Return Solution
```

FIG. 20

```
                    BloodFlowSolver

Result = solveRadon(location, FilteredFrame, RadonTable)
```

```
Struct Result {
    Angle, Confidence
}

Result = BloodFlowSolver::solveRadon(Location, FilteredFrame, RadonTable):

currentLookupTable = RadonTable + Location; // Add Location offsets to
each entry Results[] =allocateResults(angles, rotatedPatchSize);

Max = 0; MaxAngle = -1;

foreach(angleTable in RadonTables::angles)

RotatedPatch =
          CurrentImage.getROI(Location)::rotateAndInterpolate(angleTable);

Mean = 0 foreach(row in RotatedPatch)

RowSums[row] += sum(row)
            If (Sum>Max) {Max = Sum; MaxAngle = angle;}
            Mean += Sum end_foreach if (newMaxFound)

Results[angle].Angle = maxAngle

Results[angle].Confidence = calcSignalToNoise(RowSums)

end_if end_foreach

Return Results
```

FIG. 21

RAPID ASSESSMENT AND VISUAL REPORTING OF LOCAL PARTICLE VELOCITY

CROSS-REFERENCE TO RELATED APPLICATIONS

This application claims priority to and the benefit of U.S. provisional patent application Ser. No. 62/572,071, RAPID ASSESSMENT AND VISUAL REPORTING OF LOCAL PARTICLE VELOCITY, filed Oct. 13, 2017, which application is incorporated herein by reference in its entirety.

STATEMENT REGARDING FEDERALLY FUNDED RESEARCH OR DEVELOPMENT

This invention was made with government support under EY001319 awarded by the National Institutes of Health. The government has certain rights in the invention.

FIELD OF THE APPLICATION

The application relates to image processing, and particularly to image processing for the rapid and simultaneous detection and display of individual velocities of large numbers of moving objects in space-time images.

BACKGROUND

A space-time or x-t image shows time along one axis and a spacial dimension along another axis. Moving objects appear on x-t images as streaks.

SUMMARY

According to one aspect, an image processing method for determining and reporting a velocity of a plurality objects in a space-time image includes: providing an imager to acquire a plurality of images of a line at an image acquisition rate and a computer communicatively coupled to the imager; receiving a plurality of images from the imager; generating a space-time image from the plurality of images of the line; applying a mask to a subset image of the space-time image to provide a masked subset area; generating a rotational look up table of intensity values of pixels of columns and rows of the masked subset area, the rotational look up table including intensity values for columns and rows at a plurality of rotational angles; generating a radon transform based on the rotational lookup table for each subset image; computing a velocity of a plurality of objects in the subset image based on the radon transform; repeating the step of applying a mask to a subset image of the space-time image to the step of computing a velocity of a plurality of objects in the subset image substantially in parallel at about the image acquisition rate to compute a velocity of a plurality of objects in a plurality of subset images; and displaying the velocity of a plurality of objects overlaying the space-time image substantially in real-time as the plurality of images are acquired.

In one embodiment, the step of providing includes providing a scanning laser apparatus or a scanning line apparatus.

In another embodiment, the step of providing includes providing a scanning laser ophthalmoscope (SLO).

In yet another embodiment, the step of providing includes providing an adaptive optics scanning light ophthalmoscope (AOSLO).

In yet another embodiment, the step of providing includes providing a 2D imager with a frame rate, wherein each image of a line of the plurality of images of a line is extracted from each different image of the 2D images prior to generating the space-time image.

In yet another embodiment, the step of providing includes providing a multi-threaded CPU including a plurality of cores.

In yet another embodiment, the step of providing includes providing a GPU adapted for parallel computational processes.

In yet another embodiment, the step of providing includes providing images of a retina of a human eye or an animal eye.

In yet another embodiment, the step of generating a radon transform for each subset image includes a sum of corresponding elements of rotated columns in the a rotational look up table for each of the plurality of rotational angles.

In yet another embodiment, the step of computing a velocity of a plurality of objects includes computing a velocity of a plurality of objects in a plurality of blood vessels.

In yet another embodiment, the step of computing a velocity of a plurality of objects includes computing a velocity of a plurality of blood cells.

In yet another embodiment, the step of computing a velocity of a plurality of objects further includes calculating a signal to noise ratio (SNR) associated with at least one object velocity to estimate an uncertainty value for the at least one object velocity.

In yet another embodiment, the step of computing a velocity of a plurality of objects further includes a data set randomized 1:N ways.

In yet another embodiment, the step of displaying the velocity of a plurality of objects includes displaying color coded velocity lines where a color is indicative of a velocity.

In yet another embodiment, the step of displaying the velocity of a plurality of objects further includes displaying a histogram of a velocity of the plurality of objects in the space-time image.

In yet another embodiment, the step of computing a velocity of a plurality of objects includes a plurality of particles.

In yet another embodiment, the step of computing a velocity of a plurality of objects includes a plurality of fractures.

In yet another embodiment, the step of computing a velocity of a plurality of objects includes a plurality of an object selected from the group consisting of cars, ships, boats, aircraft, spacecraft, satellites, and vehicles.

In yet another embodiment, the step of computing a velocity of a plurality of objects includes a plurality of objects on a conveyor belt.

In yet another embodiment, the step of computing a velocity of a plurality of objects includes a plurality of textures or shapes.

In yet another embodiment, the step of computing a velocity of a plurality of objects includes a determination of an orientation or skew of a text in an optical character recognition (OCR) application.

The foregoing and other aspects, features, and advantages of the application will become more apparent from the following description and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 5 shows a photomicrograph marked with subfields;

FIG. 8A shows another x-t image of raw data;

FIG. 8B shows a binary overlay which overlays the local angle found with a binary color map which shows magenta for data that had high SNR;

FIG. 8C shows that a spectrum of confidence intervals can be assigned to individual subfields revealing the local strength of the signal;

FIG. 19 is a block diagram and pseudo code for an exemplary main event loop process;

FIG. 20 is a block diagram and pseudo code for an exemplary blood flow solver process including an exemplary routine to build a radon look up table; and FIG. 21 is pseudo code for an exemplary blood flow solver process including an exemplary radon transform routine.

DETAILED DESCRIPTION

Figure 1:
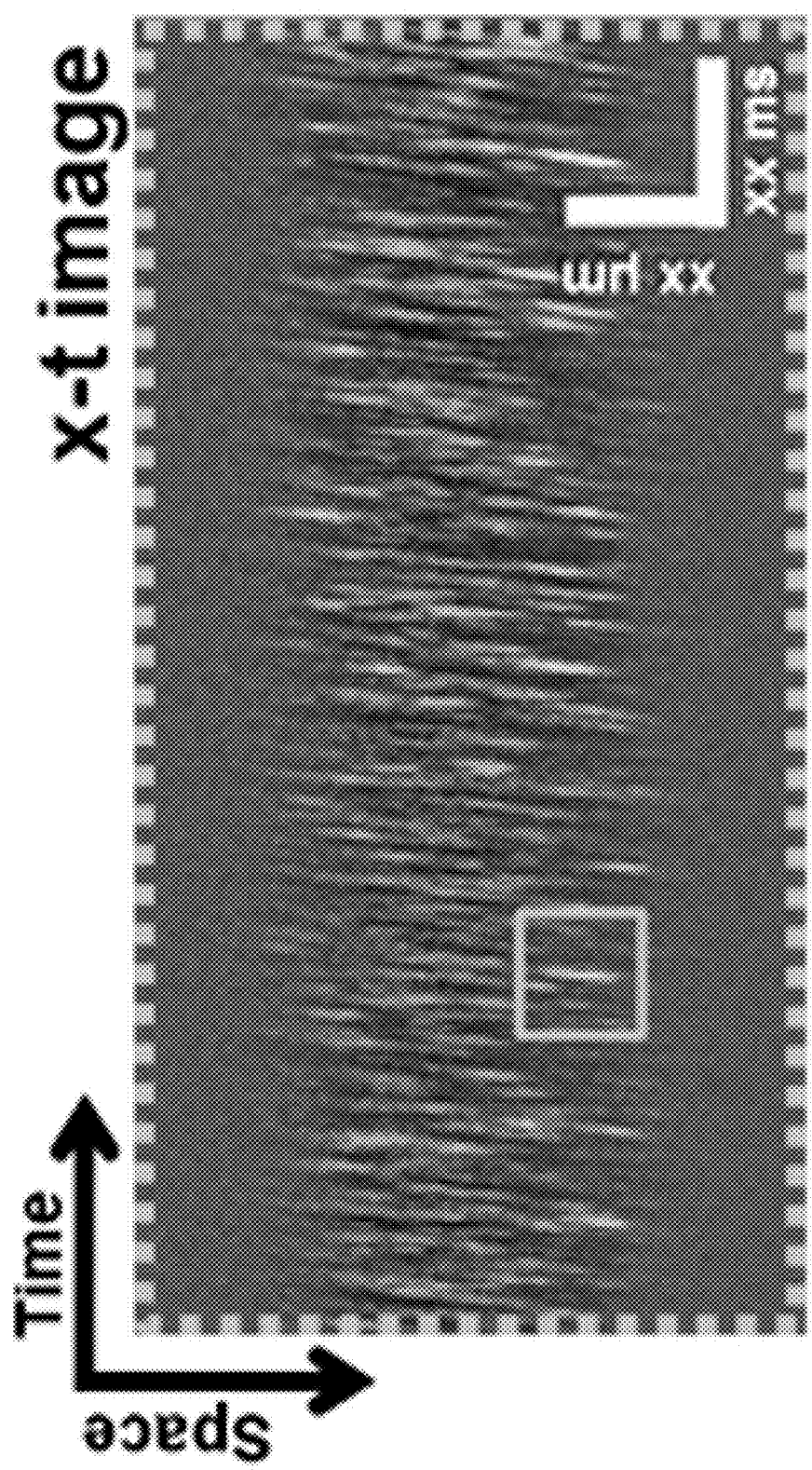
FIG. 1 shows a photomicrograph of blood cell data collected with an AOSLO in point-scan mode.

The Application describes a new method and system for the rapid assessment and visual reporting of local particle velocity using an optimized radon transform based on a rotational look up table.

As described hereinabove, a space-time or x-t image shows time along one axis and a special dimension along another axis. Moving objects in space-time images show as streaks.

One example of x-t imaging was described in U.S. patent application Ser. No. 14/602,480, System and method for observing an object in a blood vessel, which is also assigned to the University of Rochester. The Application describes a special case of line scanning by use of an adaptive optics scanning light ophthalmoscope (AOSLO) where scanning is performed about perpendicular to a blood vessel for In Vivo remote sensing of moving objects in blood vessels, such as blood vessels in surfaces near the retina of the eye. Others have described different techniques for scanning blood vessels at other angles to create x-t images. The x-t images of moving blood cells have been analyzed to determine the velocity of blood cells. However, analysis techniques to date, ranging from manual graphical tracing of streak lines to some automated processing routines, have been limited in the number of cells which can be tracked, and the speed of conventional automated processes. In fact, the best automated processes to date have had to limit instrument scanning speeds to provide timely reports. Faster computation alone of either existing manual methods or automated methods is insufficient to allow for near real-time reporting of object velocities in x-t images from line scans (e.g. from scanning laser instruments), or x-t images generated from successive conventional 2D images (by extracting lines of any suitable width (e.g. pixel width)). What is needed is a new method that allows for the simultaneous determination of velocities of relatively large numbers of objects in space time images without need to throttle back (reduce) scanning instrument scan speeds or frame rates. What is also needed is a new graphical reporting method to allow a human user to visualize the velocities of relatively large numbers of objects (e.g. tens to more than many hundreds of thousand objects) in a graphical report.

In one embodiment, the method and system of the Application can provide, for example, a rapid determination of regional blood flow within a vessel over time. By use of adaptive optics ophthalmoscopy, fast camera capture can be combined with high spatial resolution to resolve single blood cells moving within vessels of the eye. The method and system of the Application provides a computational strategy to processes data in real-time to provide visual and numeric feedback to an instrument operator. Through such visual and numerical feedback in real-time a variety of ways to graphically visualize single blood cell speed, evaluate blood cell imaging signal quality and report dynamic changes associated with blood flow over time are described hereinbelow.

The method and system can make use of, for example, serial and parallel CPU and GPU computer processing architecture to further enhance the speed, precision and accuracy of the measurement. By performing real-time analysis, the method and system permits a clinician, researcher or instrument operator to monitor changes in blood perfusion while the data is being acquired, thus removing the problem of a post-processing bottleneck. The fast implementation of this analysis of the method and system, also allows for a dense sampling of a data matrix to provide highly detailed maps of regional blood flow within the vessel to be analyzed quickly in post-processing.

Drew, et. al. described a method for the rapid determination of particle velocity from space-time images using the Radon transformation, Journal of Computational Neuroscience in 2010. Drew used a Radon transform to determine the velocity of blood cells in space-time images, and compared their method with the common wisdom at that time for doing the same, Singular Valued Decomposition (SVD). Drew found that the use of the Radon transform led to improvements in both speed (~25 times faster than SVD) and robustness to noise. Drew's technique used the Radon function present in the Image Processing Toolbox of Matlab™ (Version 7.5.0 R2007b, Mathworks, Natick, Mass.). Drew's method depended on a contrast dye for blood cell visualization enhancement.

One of the problems with Drew's approach included the need for contrast dye. Another problem is the prior art approach to implementing the Radon transformation required a large table calculation each time the Radon function was called. Also, to reach a time comparable to the data acquisition time, Drew's method had to both optimize the angle-search space adaptively with a course fine approach as well as to exploit a low density of pixels in the time dimension, which limited scan times to just over 1 kHz.

What is needed is a rapid assessment and visual reporting of local particle velocity that does not require administration of a contrast dye. Also, what is needed is a new method to calculate Radon transformations in a space time image (virtual 2D image) without need to recalculate a large table for each successive Radon transformation. Also, what is needed is a near realtime method for a rapid assessment and visual reporting of local particle velocity which allows a 1D scan line rate, such as, for example by an AOSLO type instrument, or as otherwise derived at high rate from more conventional 2D images, at rates over 10 kHz.

The new method and system described hereinbelow does not depend on a contrast dye for blood cell visualization enhancement. A new Radon transformation process reports a ~100 times improvement in speed over Matlab's implementation of the Radon transform used in Drew et al. In brief, a rotational look-up table is used which is calculated only once for a given kernel size. By contrast, prior art processes, such as the Matlab Radon transformation function calculates a relatively large table every time the Radon function is called. With the new Radon process described hereinbelow, large space-time images can be chopped-up into many smaller ROIs, where the Radon transform can be quickly calculated for each ROI. Such a 'gliding box' technique to analyze space-time images has been used, however with the of the new Radon transformation process, the improvement in speed enables us to perform high-accuracy analysis in time-scales similar to data acquisition time where the data acquisition times are no longer limited by the analysis process can operate substantially without limitation at the capability of line scanning or image scanning rates. To further speed up the new method, the new Radon transformation process can schedule multiple threads to work on cache coherent chunks of memory to optimize L1 and L2 cache misses on each CPU core, which further improves computation speed.

By combining the new Radon transformation process by look up table, with the use of multiple threads and cache coherent chunks of memory to optimize L1 and L2 cache misses, the method and system of the Application operates at data acquisition times comparable to some of the fastest scanning techniques.

While Drew reported a complete analysis in a time scale similar to their data acquisition time, they needed to optimize the angle-search space adaptively with a course fine approach, and to exploit a low density of pixels in the time dimension (scan rate of 1.6 kHz in Drew et al. compared to our scan-rate of 15.06 kHz). Drew's low scan rate limits the upper limit of cell velocities that can be analyzed. Drew et al. report the maximum velocity that can be analyzed by their method to be 150 mm/s. So far, in experimental implementations, the method and system of the Application has been able to reliably measure object velocities to about 1.7 m/s (1700 mm/s).

General strategy: The method and system of the Application makes use of a fast look-up-table conversion of the Radon transform which allows traditional x-y Cartesian matrix data to be re-addressed in memory in the form of a rotational matrix. This provides a fast way to perform a local Radon transformation at independent locations simultaneously. In one embodiment, the local velocity of one or multiple moving blood cells can be computed at the same time as separate analysis performed at multiple regions in time or in space within the data set. This can provide a simultaneous measurement of blood flow across a vessel lumen (showing position dependent flow velocity; such as, laminar or non-laminar flow). Or alternatively, the analysis can perform simultaneous measurements of velocity over time revealing variations in flow such as a stimulus-evoked blood flow change or cardiac pulsatility. The approach of the method and system described in more detail hereinbelow, can also search for modulations in vessel flow in response to physiological challenge such as a stimulus-evoked blood flow or systemic/local flow regulation. Such exemplary applications can serve as markers of physiological health of the organism.

The rotational look up table of the Application performs a method of re-addressing pixel coordinates in a rotational matrix to alleviate a computationally "expensive" step in the Radon transform. The rotational lookup table can be applied to a large number of regions of interest (ROIs) simultaneously, or in sequence to perform large matrix operations. The method and system of the Application enables a CPU to perform computations using a fast clock-speed in conjunction with a parallel architecture, and/or a GPU to perform parallel computations in texture analysis, an optimized computation designed for GPU performance.

Figure 13:
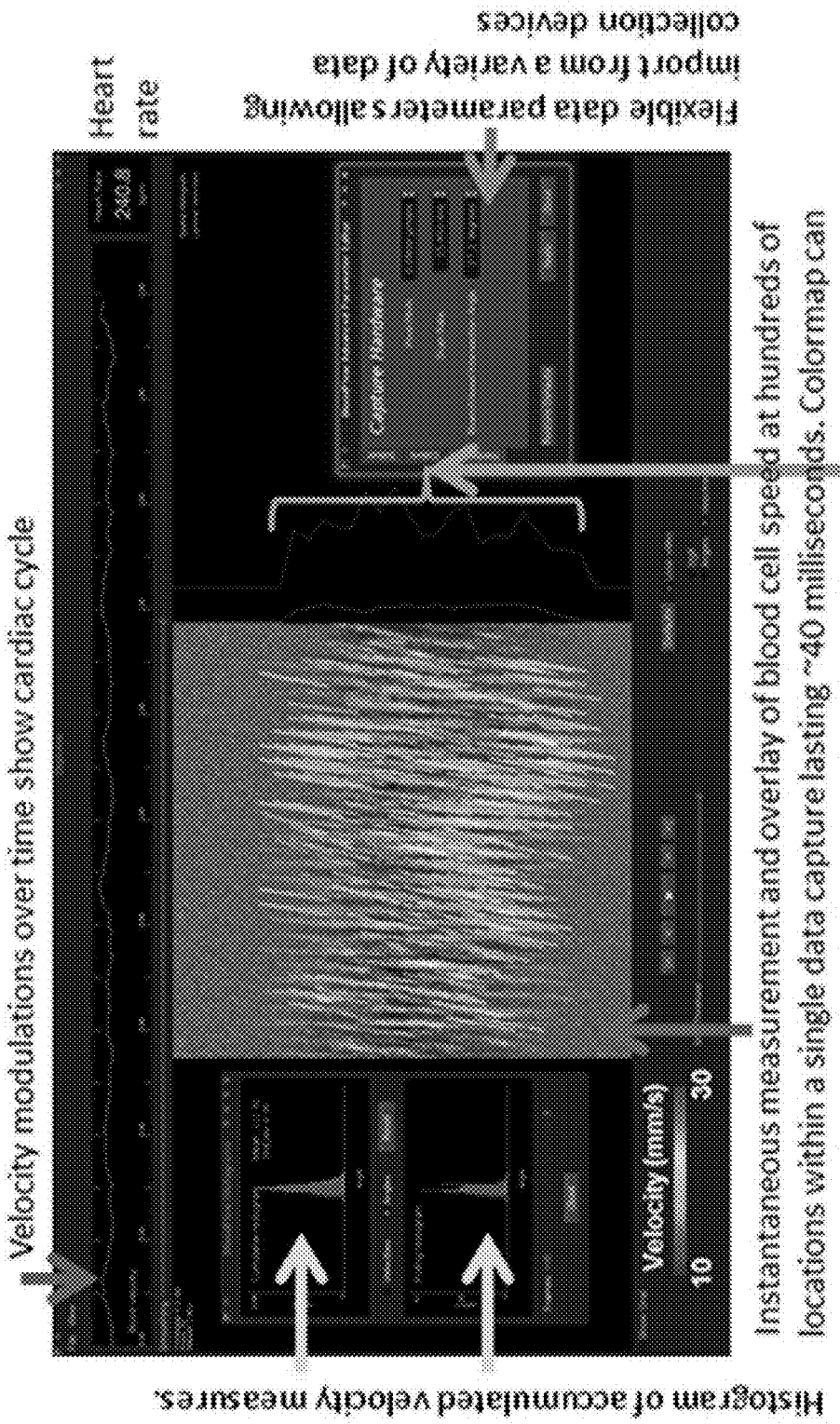
FIG. 13 shows an exemplary color coded graphical user interface (GUI)

The method and system of the Application can provide a user with a graphical feedback regarding, for example, a local signal quality, a blood flow velocity, a blood cell flux, and variations and combinations of these measures as a function of time. An example of an early generation feedback graphical user interface as shown in FIG. 13 is explained in more detail hereinbelow.

FIG. 1 shows a photomicrograph of blood cell data collected with an AOSLO in point-scan mode. In the photomicrograph of FIG. 1, a fast 30 kHz scanner measured single blood cell position as a function of time. Movement of the blood cells is represented as a diagonal streak in the image which shows space in the ordinate dimension and time in the abscissa. The slope of the streak represents the velocity of a single blood cell.

The diagonal streak image can also be referred to as a virtual 2D image. For example, in U.S. patent application Ser. No. 14/602,480, SYSTEM AND METHOD FOR OBSERVING AN OBJECT IN A BLOOD VESSEL, now allowed, and also assigned to the University of Rochester, an exemplary method for creating a virtual 2D image of an object moving in a blood vessel was described in detail. Another different technique for acquiring virtual 2D images was described by Zhong, et. al. in In vivo measurement of erythrocyte velocity and retinal blood flow using adaptive optics scanning laser ophthalmoscopy. Optics Express, 2008 Aug. 18; 16(17): 12746-12756. Both of the '480 application and Zhong publication are incorporated herein by reference in their entirety for all purposes including exemplary AOSLO methods for generating virtual 2D images.

Figure 2B:
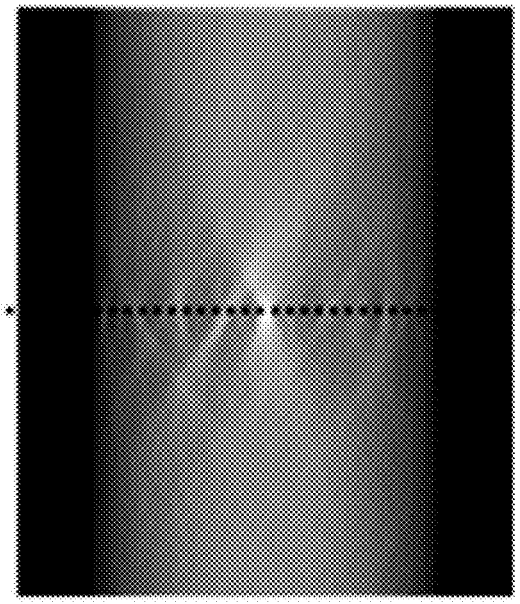
FIG. 2B shows the "radon image" of FIG. 2A. The radon image shows a columnar summation of pixel values as a function of rotation.
Figure 2A:
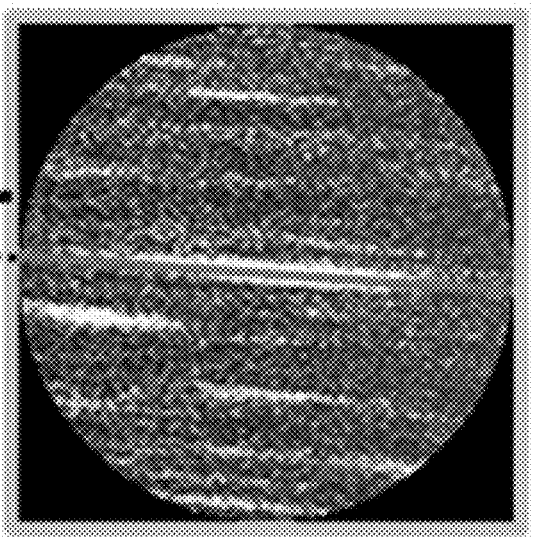
FIG. 2A shows a photomicrograph from a region of interest (ROI) of the space-time image photomicrograph of FIG. 1.

FIG. 2A shows a photomicrograph from a region of interest (ROI) of the space-time image photomicrograph of FIG. 1. A circular window was applied to mask out data so that the weighted columnar sum of pixels is equivalent, regardless of rotational angle.

FIG. 2B shows the "radon image" of FIG. 2A. The radon image shows a columnar summation of pixel values as a function of rotation. The rotation with the maximum intensity, or maximum intensity variation corresponds to the best solved angle that represents the slope of the cells in the analyzed window.

Figure 2C:
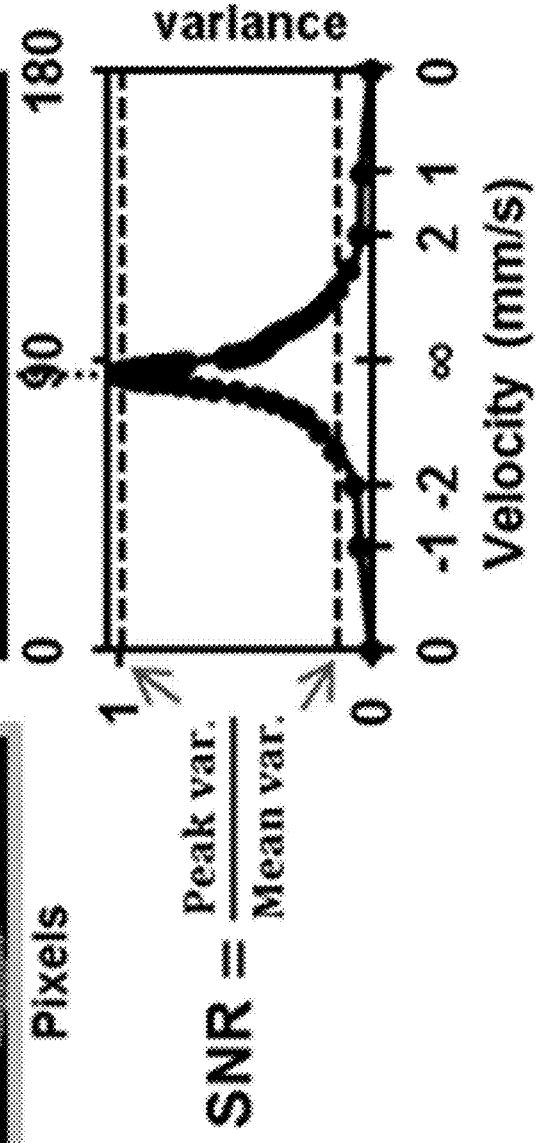
FIG. 2C is a graph which shows a measure of signal-to-noise (SNR)

FIG. 2C is a graph which shows a measure of signal-to-noise (SNR). The peak intensity variation calculated for each rotational angle (0-180) shows a peak at near 85 degrees (which represents 22 mm/s when scaling for scanner speed and vessel angle relative to the axis of the scanner). Peak to mean variance provides a measure of signal to noise. Generally, the higher the peak to baseline, the stronger the SNR value. This graph provides a way to sort the data to determine which calculations are reliable measures of velocity versus measures of noise.

Figure 3:
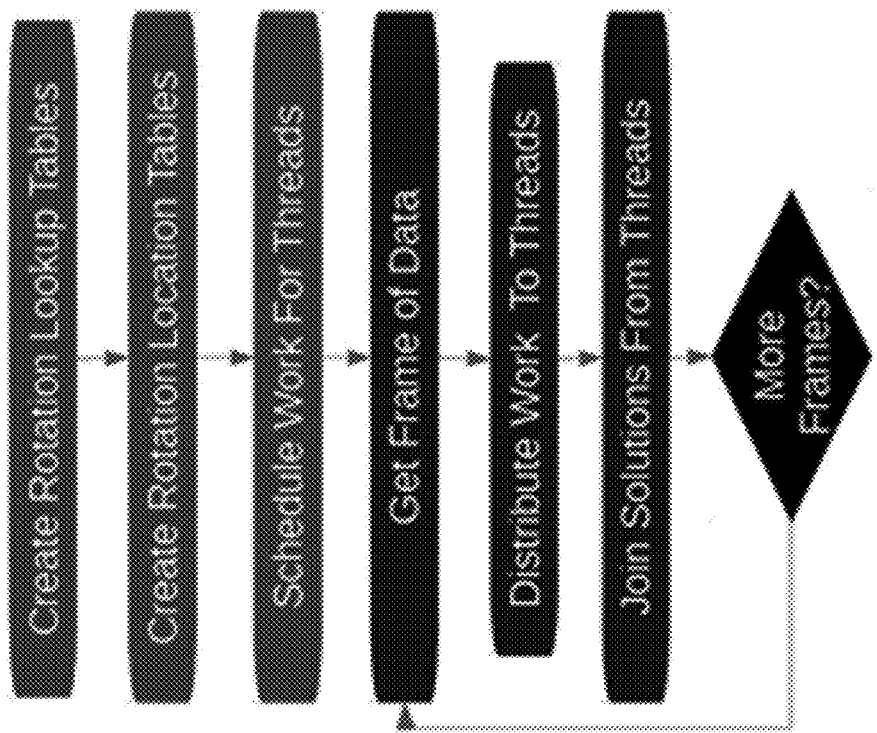
FIG. 3 is a flow chart showing a work flow of a process to rapidly repeat the measurement performed in FIG. 1 to FIG. 2C.

FIG. 3 is a flow chart showing a process which includes rotation look up tables according to the Application, to rapidly repeat the measurement performed in FIG. 1 to FIG. 2C in a serial or parallel fashion.

Figure 4:
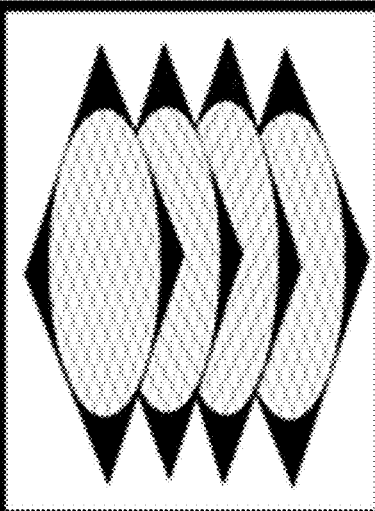
FIG. 4 illustrates a method for rapid rotational look up table development for repeated analysis across multiple region of interest "kernels"
Figure 4:
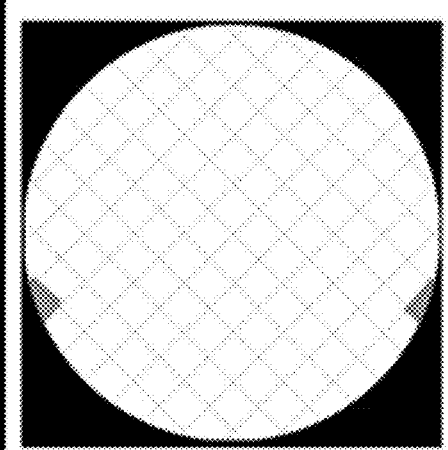
Figure 4:
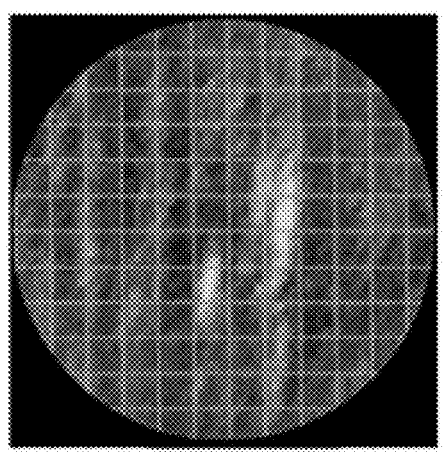
Figure 4:
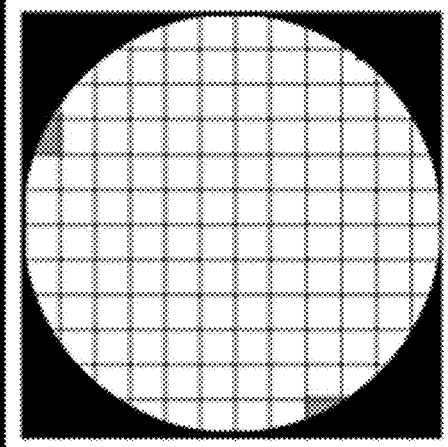
Figure 4:
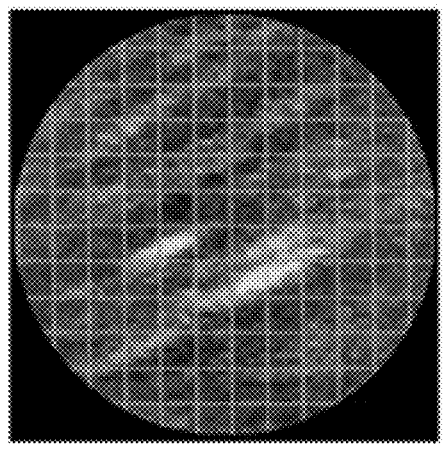

FIG. 4 illustrates a method for rapid rotational look up table development for repeated analysis across multiple region of interest "kernels" similar to the single kernel illustrated in FIG. 1. A traditional Cartesian matrix of data is typically stored on a computer as shown at left side of FIG. 4. Pixels are addressed in an X-Y space. To perform the Radon transformation which sums the projection of each column for a variety of rotation angles, a rotational interpolation must be performed. This is a computationally expensive step that is usually performed for each unique image. Our first-generation implementations showed this rotational interpolation capability using MATLAB™.

We realized a much faster alternative process based on the creation of a single look up table. According to the new method and system of the Application, we can use, for example, a computer architecture that uses onboard computer memory or memory on a graphics processing unit (GPU) to create a single look up table that can re-address pixel values into a new image which shows the same data but now rotated in fine increments. The new process which sums these rotated images produces simplified math (summation or variance calculation) that can be rapidly performed on the rotated images.

Figure 5:
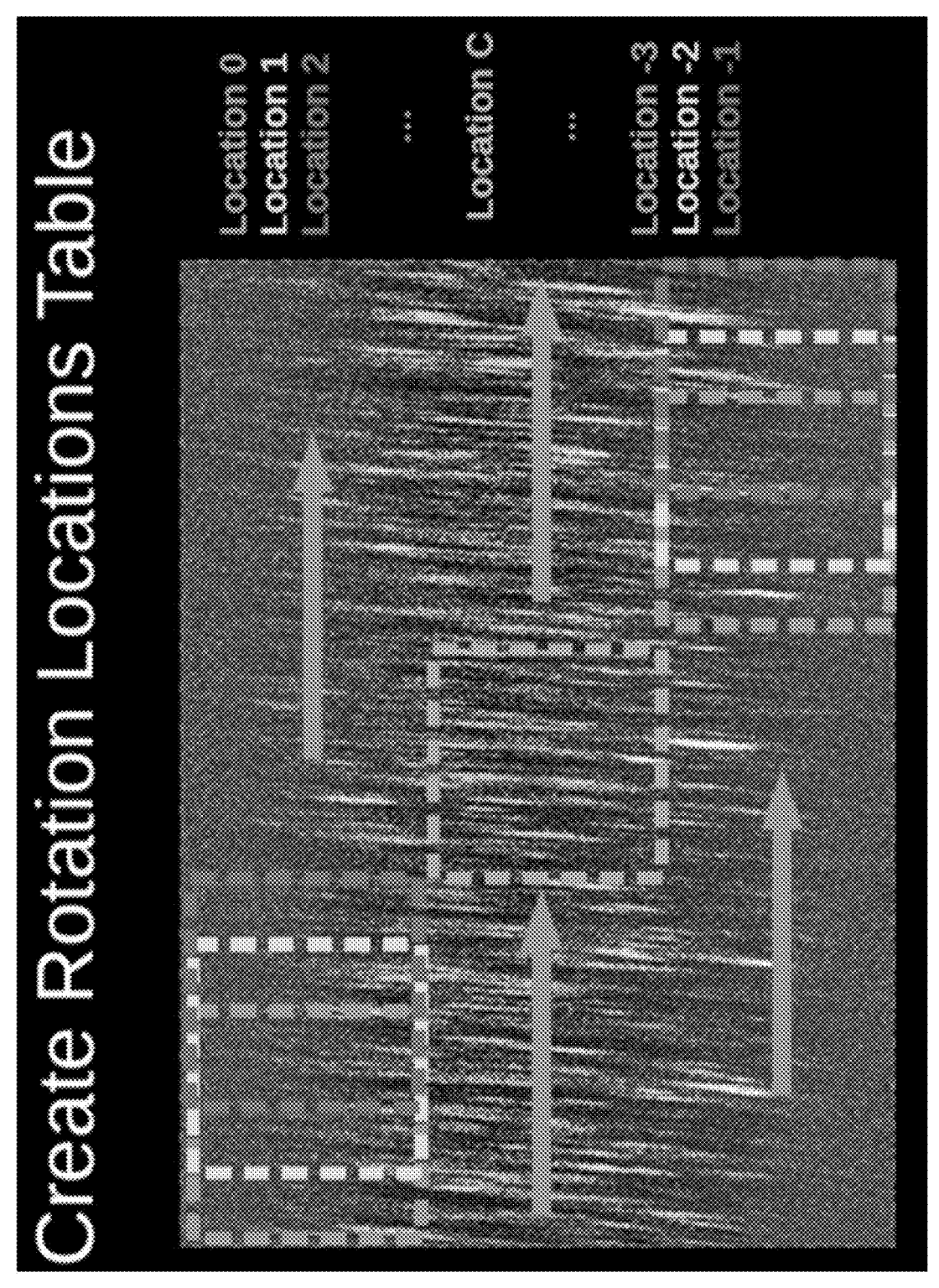

FIG. 5 shows a photomicrograph marked with subfields. Following the steps of FIG. 1-FIG. 4 as described hereinabove, the new method of the Application can use parallel computing to perform repeated, simultaneous calculations on the small subfields within the data (e.g. location 0, 1, 2 . . . n of FIG. 5). The rotational look up tables can be applied simultaneously to each subfield so that parallel calculations of the Radon solver can be performed. Each subfield is assigned to a "worker" or "thread" on a parallel computer platform. Each worker (e.g. a computer or processor core) can perform independently of its neighbor worker by use of parallel processing techniques, such as, for example, can be achieved by with one or more GPU and/or a multicore CPU (e.g. as can be enhanced through multicore optimization).

Figure 6:
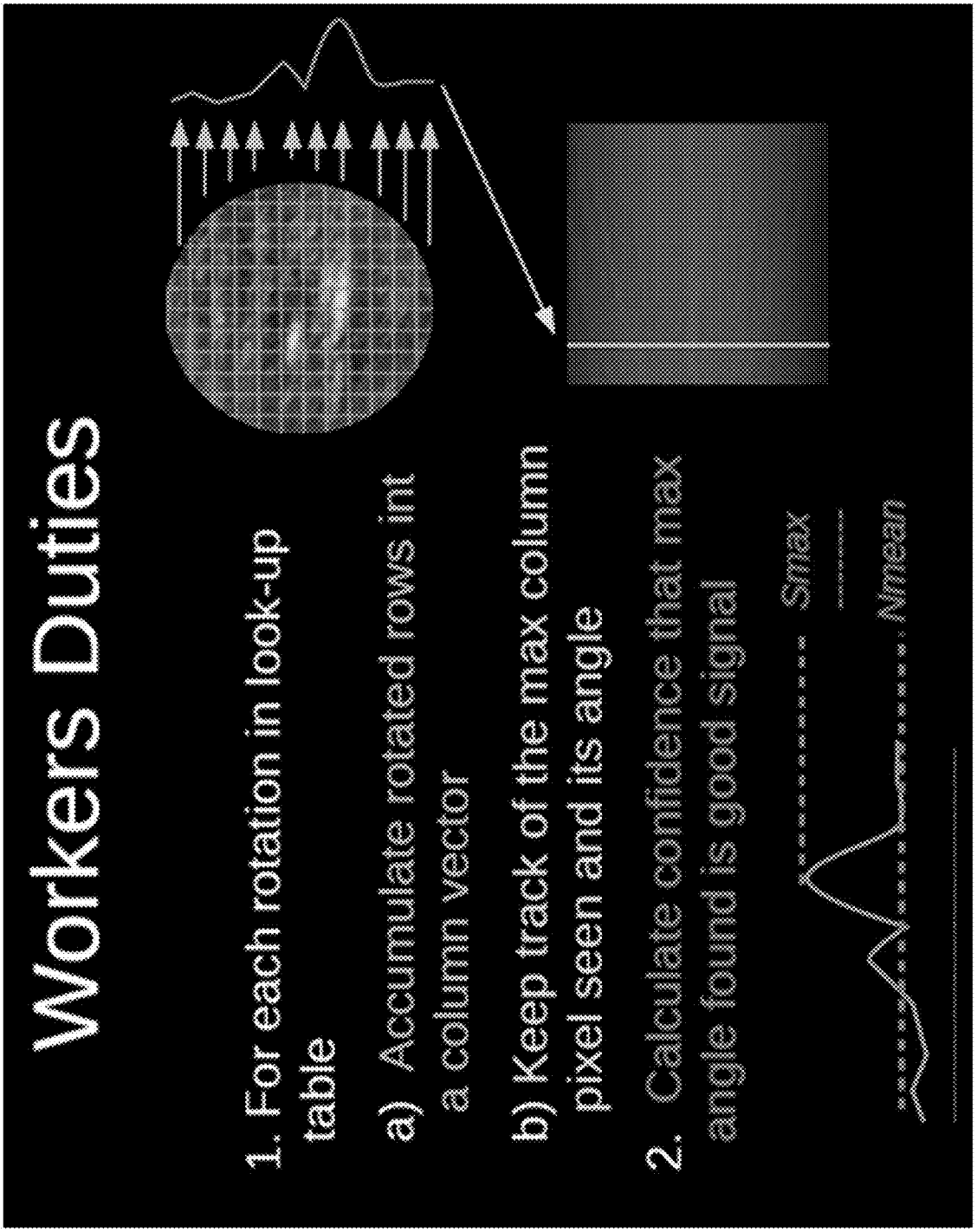
FIG. 6 shows an example of each worker's duties.

FIG. 6 shows an example of each worker's duties. Similar to the output analysis for a single analysis window of FIG. 2, the processes are now made independently and substantially at the same time in parallel, by each worker for any suitable number of analysis windows.

A solution to the need for a new graphical reporting method to allow a human user to visualize the velocities of relatively large numbers of objects (e.g. tens to more than many hundreds of thousand objects) in a graphical report overlays raw x-t images with lines of colors representing object velocities. FIG. 7 to FIG. 14 show various embodiments of the solution from simple short colored lines to a more fully functioned graphical user interface, such as for use by a medical professional in a clinical setting to view substantially real-time blood cell velocity In Vivo in a human patient.

Figure 7:
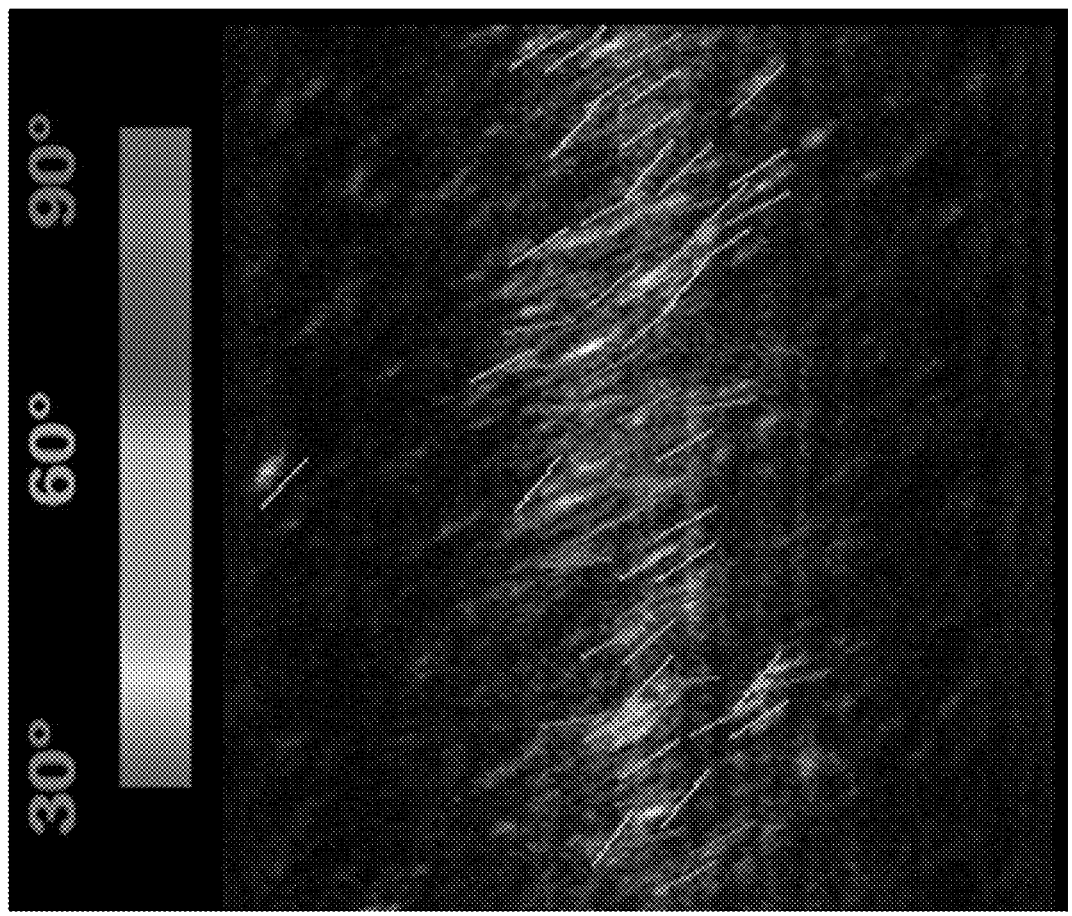
FIG. 7 shows a photomicrograph of an exemplary graphical report.

FIG. 7 shows a photomicrograph as an exemplary graphical report, where the streaks of individual cells are marked in a color code indicating the local slope which is indicative of cell velocity. The grayscale data represents a raw data showing single blood cell streaks. The workflow solver then gathers the report from each of the parallel workers to superimpose a local analysis of blood flow as colors which represent the local slope found within the image. Fast moving objects are near vertical. Slow moving objects are shallower closer to horizontal.

Graphical overlay of local velocity information: FIG. 8A shows another x-t image of raw data. FIG. 8B shows a binary overlay which overlays the local angle found with a binary color map which shows magenta for data that had high SNR. Cyan data is those locations with weak SNR. This process favors solutions within the band of data where blood cells reside (in central band of image). The process rejects data where there is noise or insufficient slope information. FIG. 8C shows that a spectrum of confidence intervals can be assigned to individual subfields revealing the local strength of the signal. Notice the strong agreement of angles near ~85 degrees within the blood vessel. These have high SNR. The data outside of the blood vessel (dark blue data) shows high uncertainty and variance in the reported slope indicating insufficient SNR.

Figure 9:
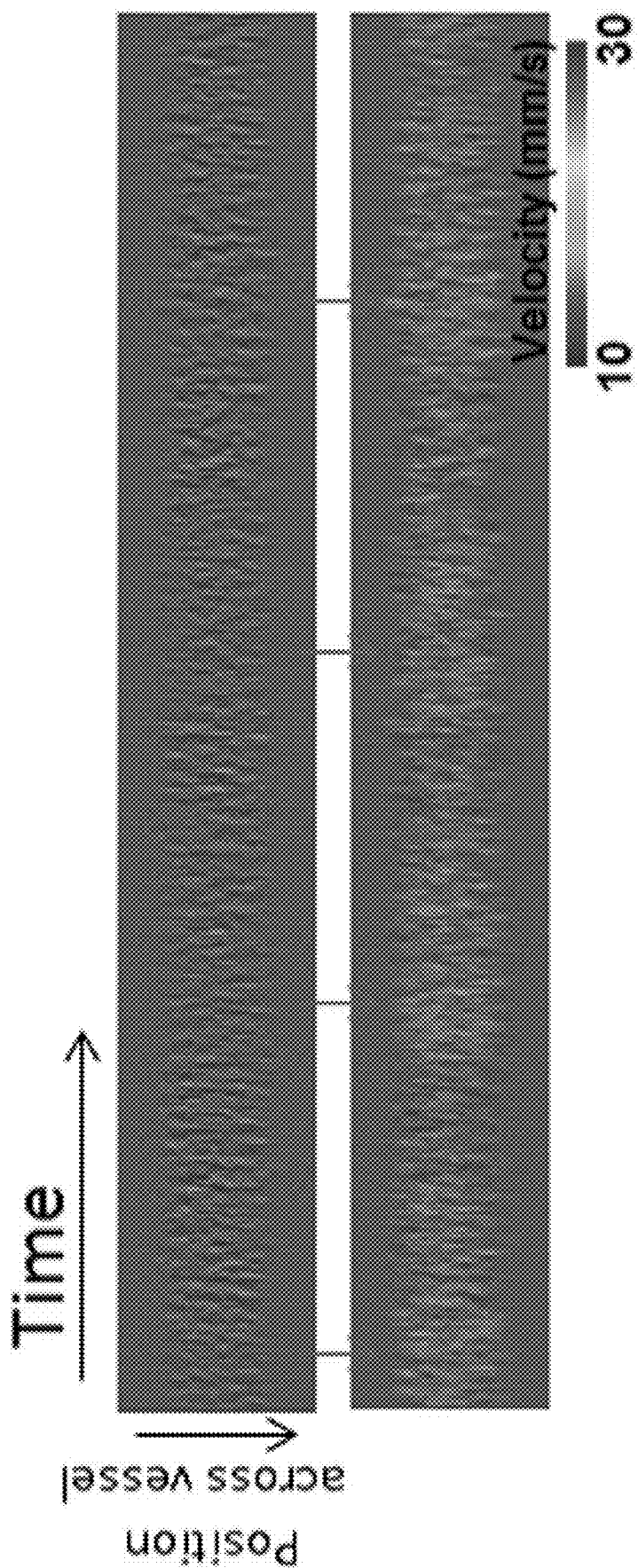
FIG. 9 shows a raw x-t image over a processed x-t image with color blood flow data.

FIG. 9 shows a raw x-t image over a processed x-t image with color blood flow data. A dense and highly overlapping analysis was performed on blood flow data using the method described hereinabove. The lower processed x-t image shows the superimposed velocity information. Here, a user's eye can see subtle changes in velocity as a function of time. Such subtle changes are not visible in the image at top, but with this augmented visualization the lower processed x-t image enables the user to visualize and determine blood flow changes as a function, for example, of a cardiac cycle. Four diastolic cardiac cycles shown with red arrows.

Figure 10:
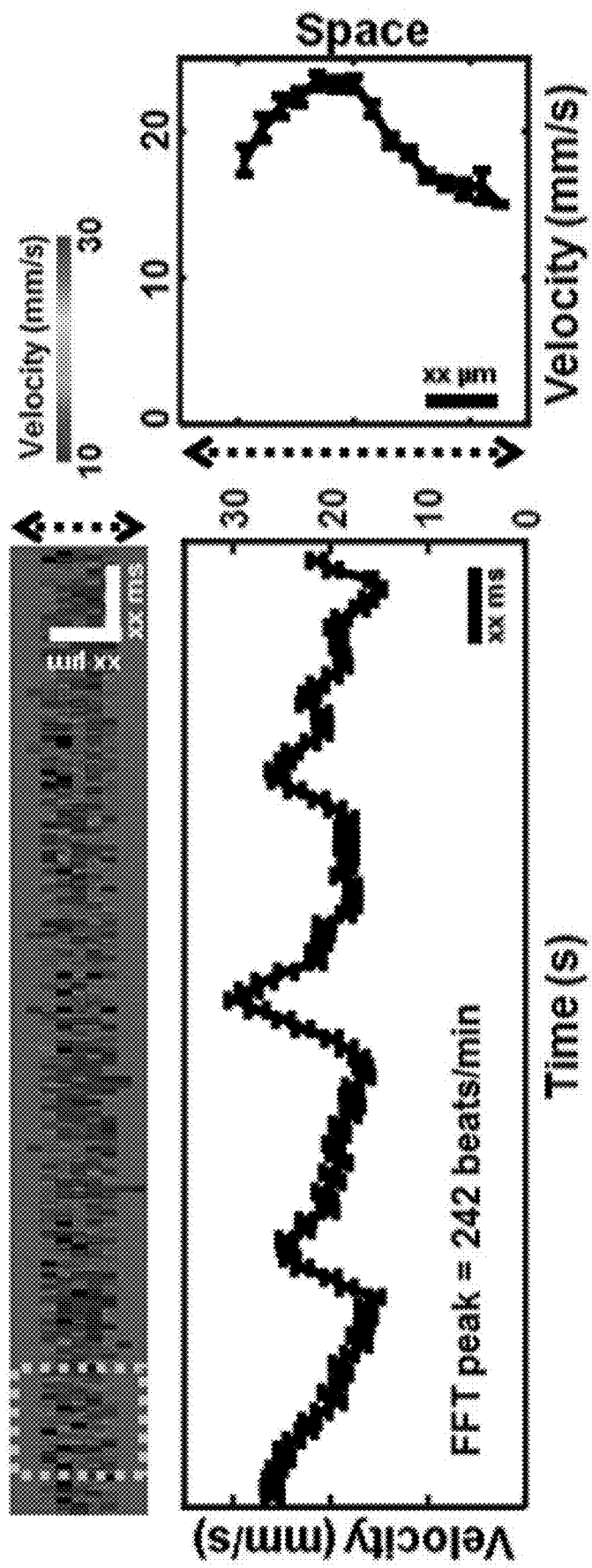
FIG. 10 shows another processed x-t image with more utility applications including graphs of cell velocity vs. time and cell velocity across space.

FIG. 10 shows another processed x-t image with more utility applications including graphs of cell velocity vs. time and cell velocity across space. Local measurements of single cell velocity over time show variations of blood cells speed as a function of cardiac cycle (data from mouse retina), the window shows approximately 1 second of data collection (>30,000 lines analyzed). Speed fluctuations for all kernels that passed threshold criteria (FIG. 8) are superimposed (top) and graphically reported below. Similarly, an analysis of local measurements of blood cell speed across the vessel from vessel-wall to opposite wall (lumen) shows laminar-like blood flow as a function of position across the blood vessel.

Figure 11:
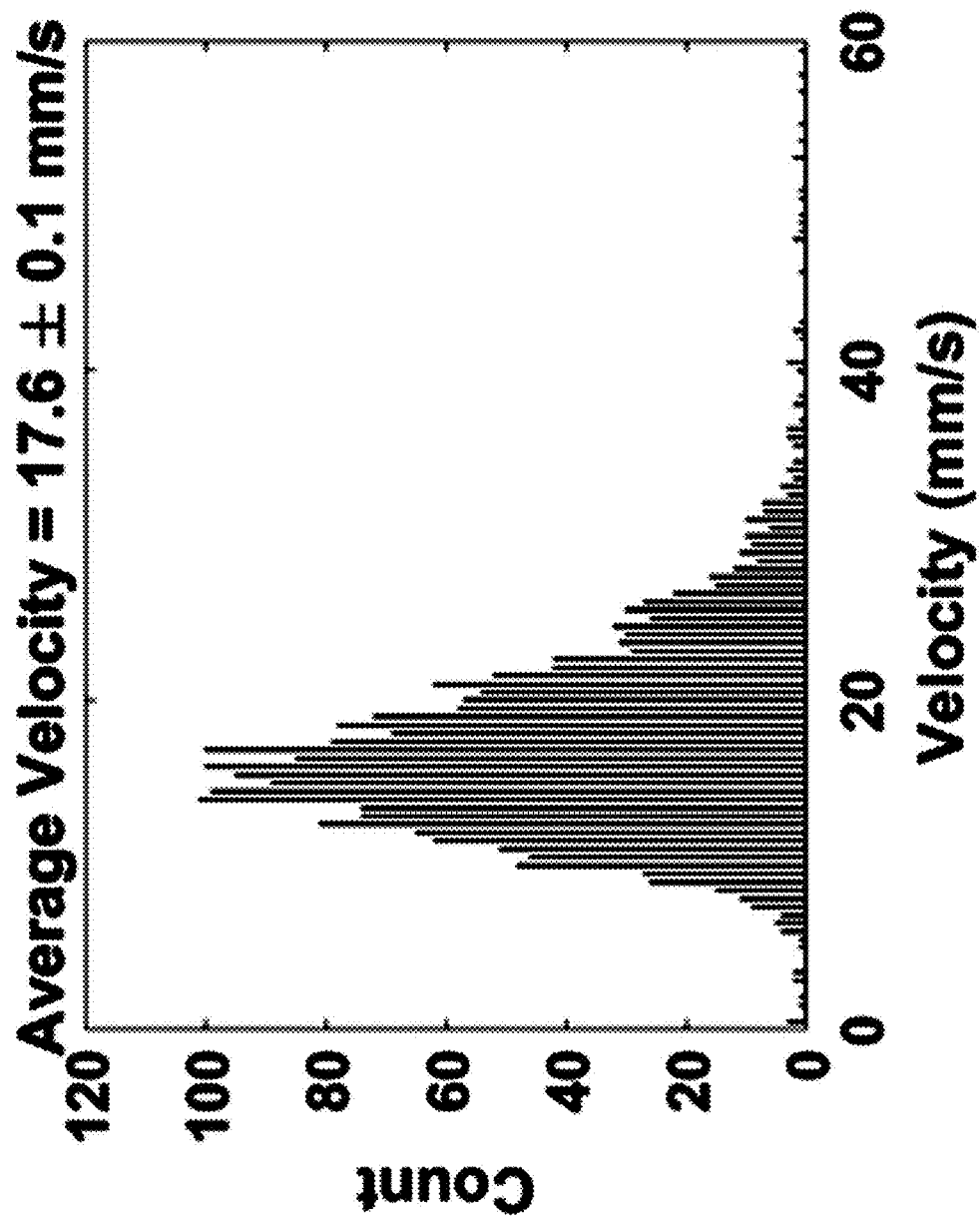
FIG. 11 is a histogram which shows independent velocity measurements performed at thousands of locations across a vessel and at different points in time.

FIG. 11 is a histogram which shows independent velocity measurements performed at thousands of locations across a vessel and at different points in time. The distribution in data arises from the local and temporal variation in single blood cell speed shown in FIG. 10. This quantitative data that can be analyzed both in real-time as data is collected and the accumulation of data over time. These measurements can serve as a biomarker of vascular perfusion integrity paramount to central nervous system function.

Figure 12:
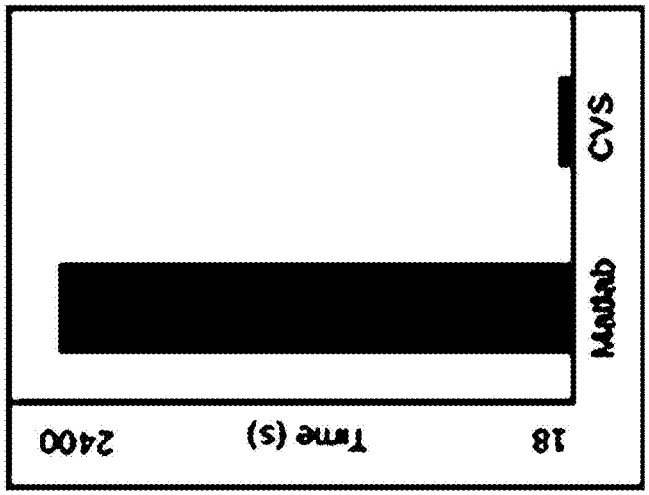
FIG. 12 is a table and bar graph showing the speed increase of the new method of the Application, over conventional of Radon calculation strategy.

FIG. 12 is a table and bar graph showing the speed increase of the new method of the Application, over conventional strategy of Radon calculation. This example shows parallel improvements on a CPU. Greater improvements will scale with GPU speed and number of workers. At this kernel density, performance is 1.8× slower than real-time analysis when performed on a CPU. Positioning sparser kernels in time or space will provide real-time output of velocity values in both time and space.

FIG. 13 shows an exemplary color coded graphical user interface (GUI). In this example, the user display provides augmented and quantified data superimposed on the raw data. This provides real-time feedback to the instrument user to optimize, collect, refine, or investigate conditions of interest on-the-fly.

Figure 14:
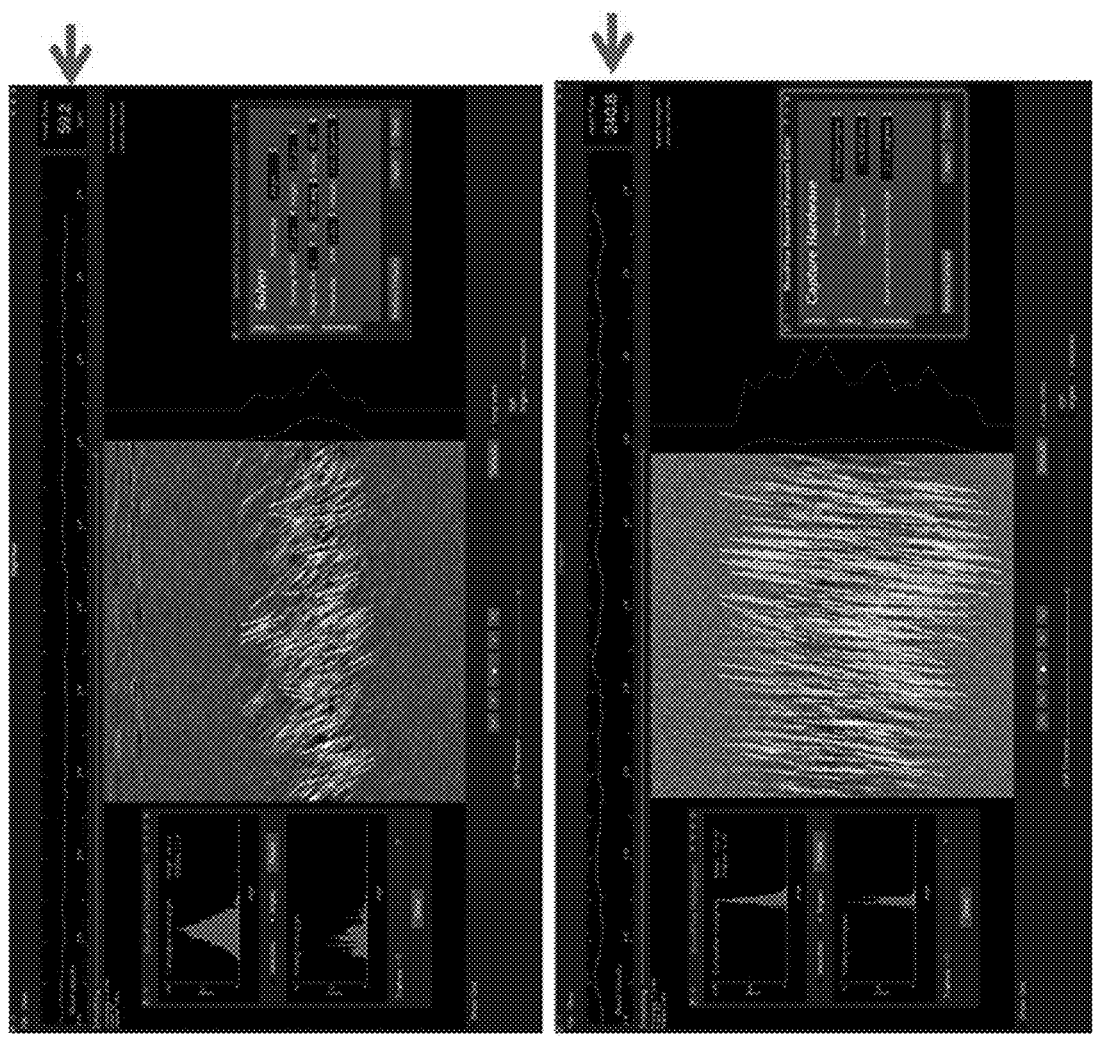
FIG. 14 shows another exemplary GUI screen.

FIG. 14 shows another exemplary GUI screen. Data from human retina was analyzed at the top. Data from a Mouse retina was analyzed at bottom. Note that the software correctly extracted the cardiac cycle corresponding to the human (59 beats per minute, top red arrow) and a mouse heart rate (240 beats per minute, bottom red arrow). Flexible architecture allows user parameters to be adjusted to accommodate the properties of the imaging device being used. As described in more detail hereinbelow, the new method and system (e.g. using any suitable line scanning device, or processing lines from conventional 2D imaging can be used as a new image processing technique for applications beyond ophthalmoscopic imaging.

Figure 15:
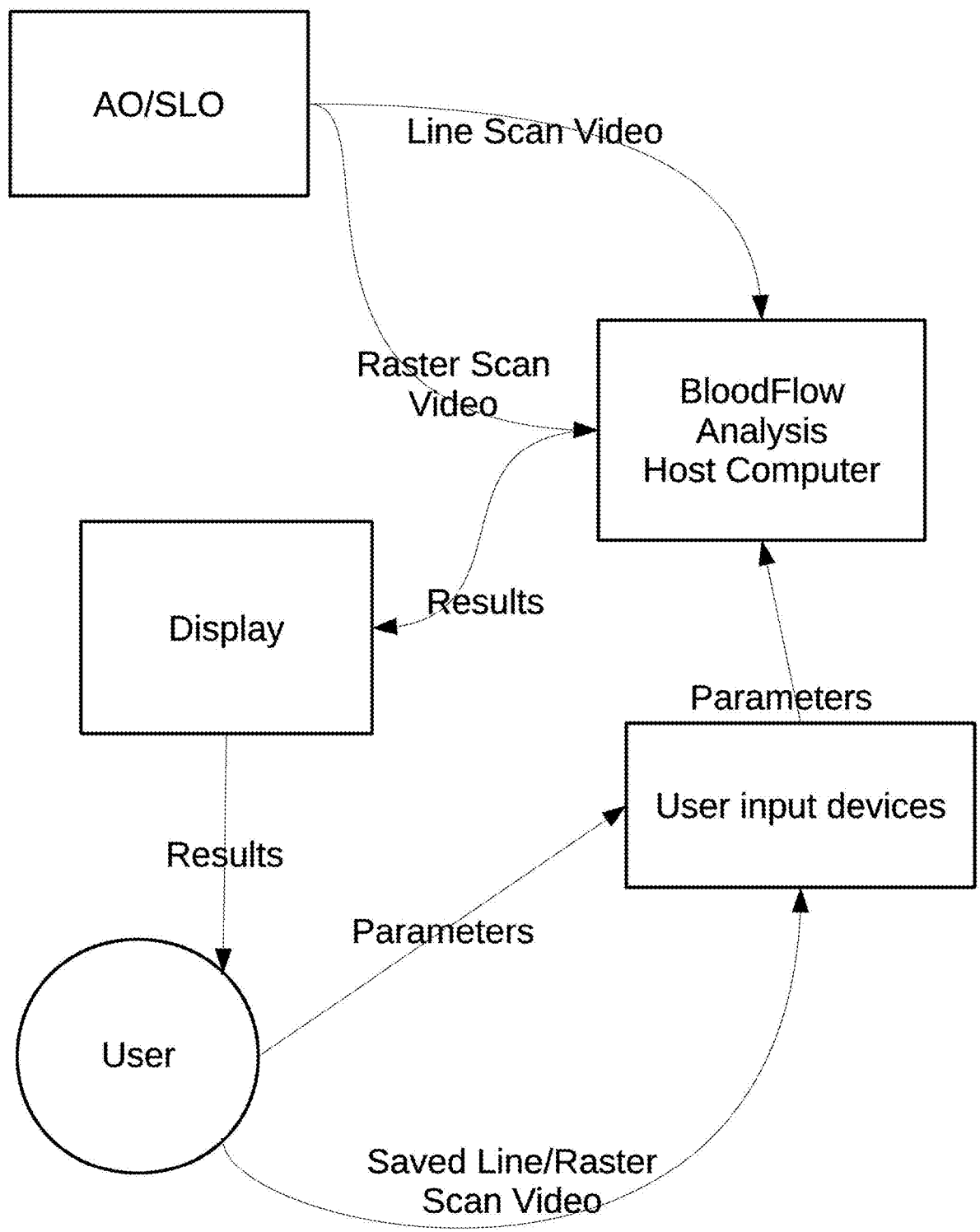
FIG. 15 is a block diagram showing an exemplary AOSLO hardware and computer system for performing the new method of the Application.

FIG. 15 is a block diagram showing an exemplary AOSLO hardware and computer system for performing the new method of the Application.

Figure 16:
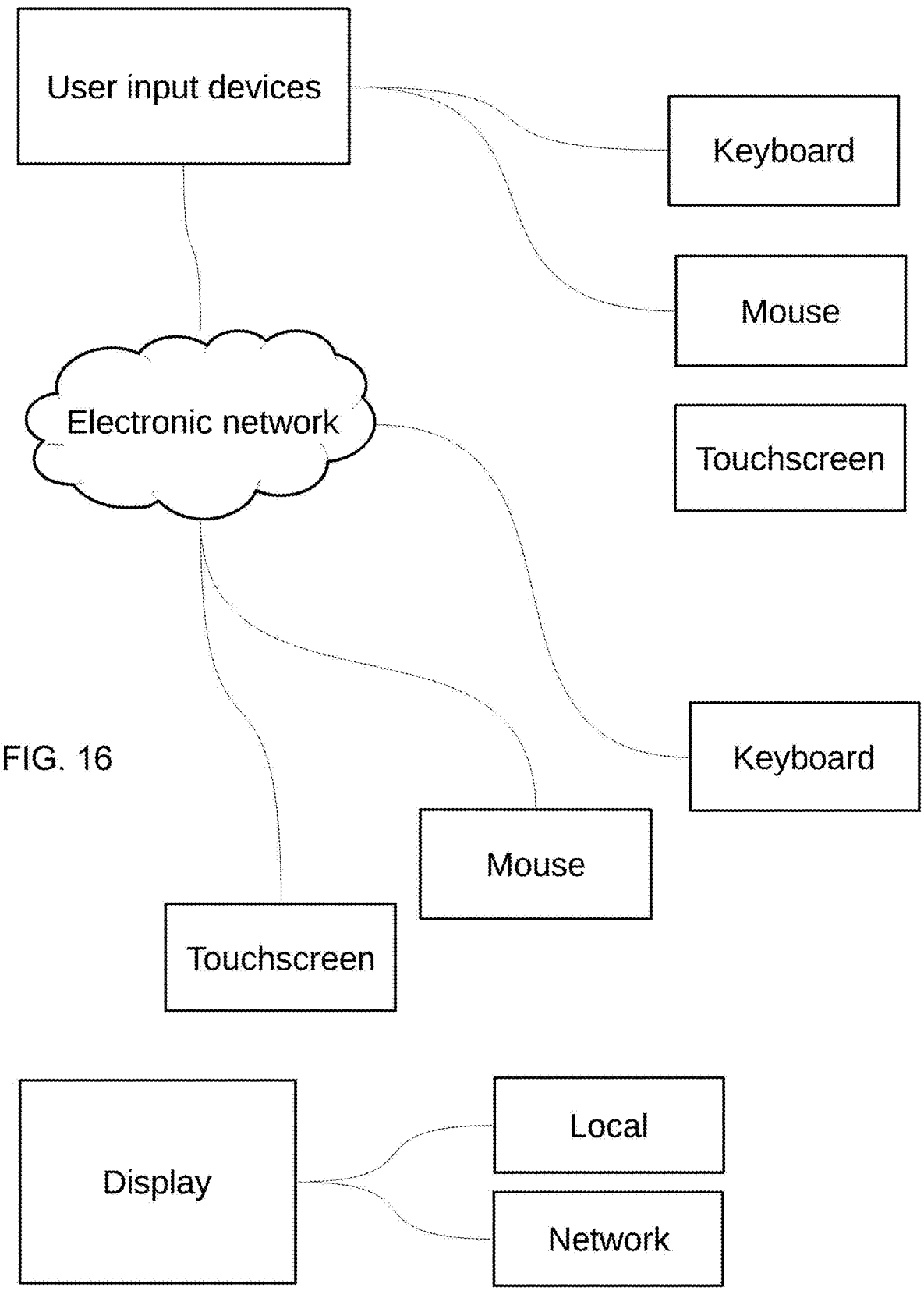
FIG. 16 is a block diagram showing an exemplary computer system for running processes of the new method of the Application.

FIG. 16 is a block diagram showing an exemplary computer system for running processes of the new method of the Application.

Figure 17:
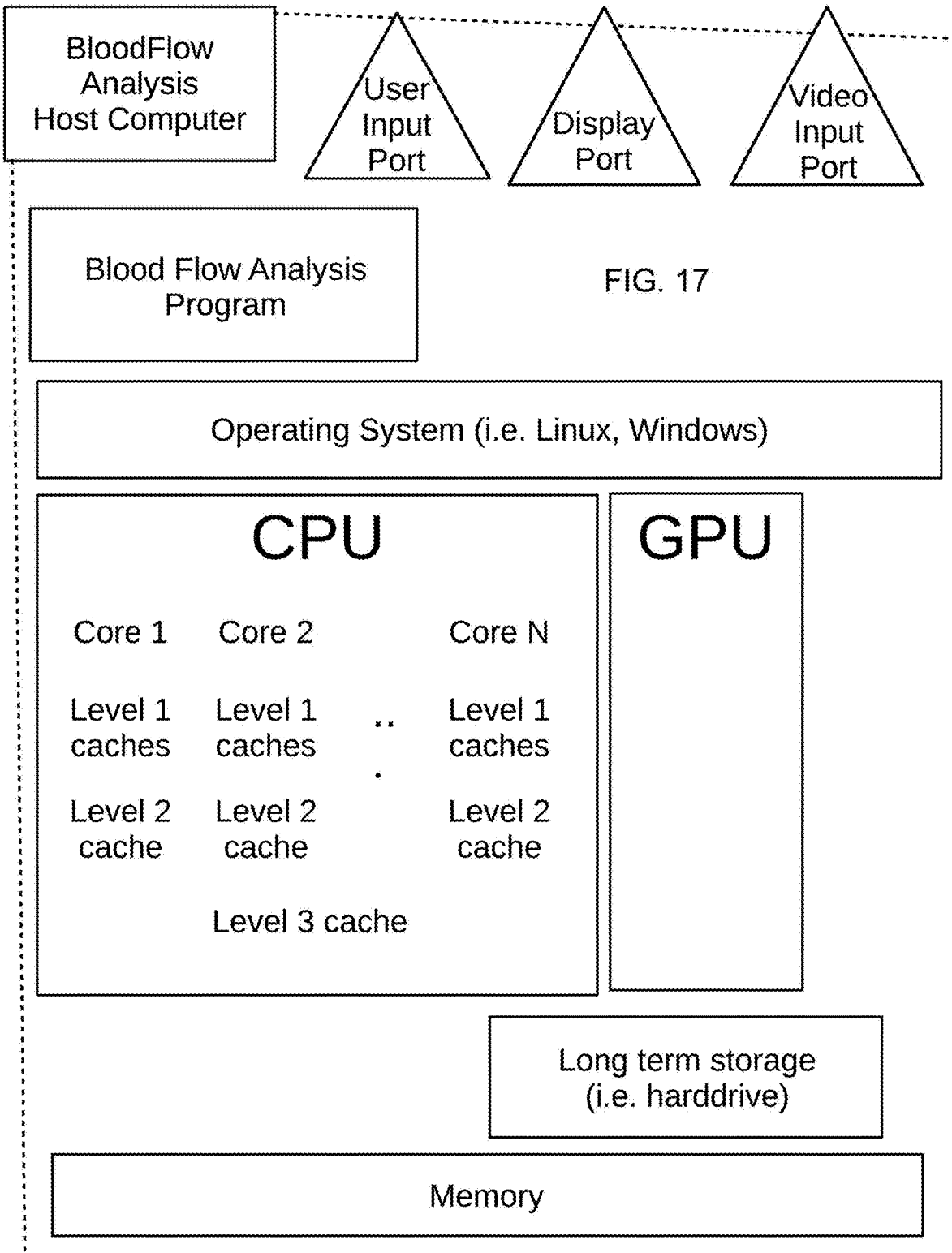
FIG. 17 is a block diagram showing an exemplary computer system architecture for running processes of the new method of the Application.

FIG. 17 is a block diagram showing an exemplary computer system architecture for running processes of the new method of the Application.

Figure 18:
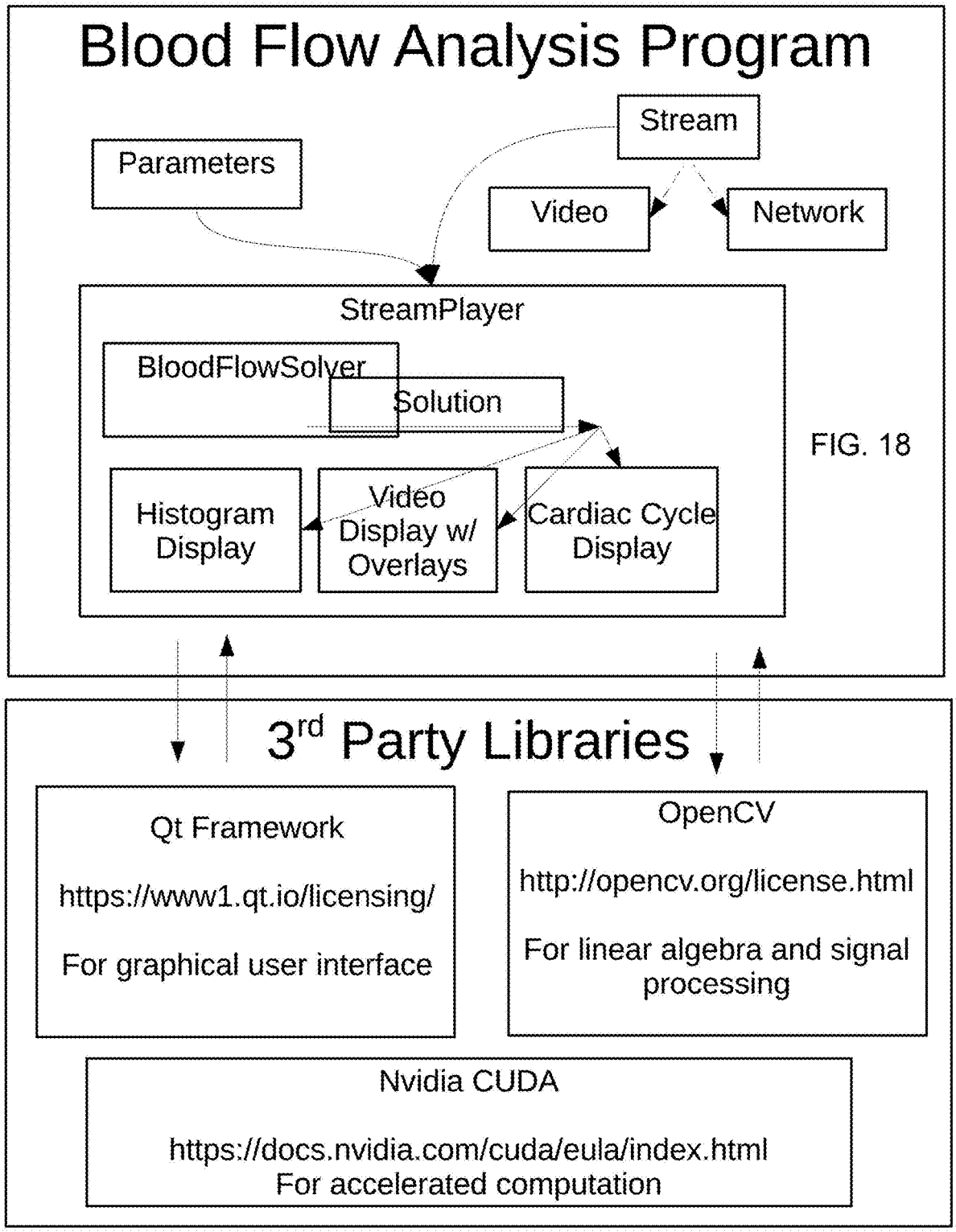
FIG. 18 is a block diagram showing an exemplary process architecture of a blood flow analysis program.

FIG. 18 is a block diagram showing an exemplary process architecture of a blood flow analysis program.

FIG. 19 is a block diagram and pseudo code for an exemplary main event loop process.

FIG. 20 is a block diagram and pseudo code for an exemplary blood flow solver process including an exemplary routine to build a radon look up table.

FIG. 20 is pseudo code for an exemplary blood flow solver process including an exemplary radon transform routine.

Flexibility and Accuracy

Accuracy, density of sampling and speed can be scaled to reflect the precision and intention of the data analysis to be performed. For example, accuracy can be limited to serve the advantage of speed. Conversely, the algorithm can favor precision and accuracy while slowing in speed. All parameters scale as CPU/GPU performance increase, however, our workflow allows each to be scalable on the fly to optimize the need at hand. For example, fast coarse measurements can be performed in real time which allow direct user feedback. Whereas detailed level analysis can be performed with high sampling density and high accuracy while taking more time but providing more detailed results. These parameters can be modulated in real time by changing the kernel size, number of rotational angles searched, deploying larger or smaller numbers of "workers" or computer "threads". Varying these parameters in real time also allow for an optimization strategy to be performed in real-time.

The fast approach described hereinabove also allows for the rotational look up table to be applied to not only to the original data set being analyzed, but also the same data set that has been spatially or temporally scrambled (randomized). The comparison of the Radon transform data from the original vs the 1:N scrambled data set provides an increased ability to determine the real local angle information in the region of interest. Subtraction of the scrambled Radon detection from the result from the original data set provides greater peak detection to determine the local angle within the region of interest.

Because the data set can be randomized 1:N ways, the fast, parallel work flow can assign and scramble data to 1:N workers. This allows multiple workers to independently solve their radon transform on the same data in scrambled space so that they can be recombined in a way to increase signal to noise of the real-data peak detection.

To date, we have performed proof of concept work flow implementations to show both real-time and fast, dense analysis measurements that provide rapid user feedback with graphical display of quantitative data. Our work flow demonstrated several representative methods to visualize the data to augment user interpretation of data.

Exemplary Applications:

In adaptive optics scanning laser/light ophthalmoscopes, the ability to quickly render blood flow analysis data based on local radon angle.

A strategy to provide a rotational version of an image using a repeatable and rapidly deployable rotational look-up-table to rotate multiple subfields within an image simultaneously.

A scalable workflow that permits multiple analyses for local blood flow to be performed independently and simultaneously.

A deployable parallel architecture that can be deployed to multiple CPU or GPU workers to provide a fast and accurate result.

A conceptual strategy to superimpose real-time quantitative data on raw data as it is collected.

An augmented graphical representation of particle flow permits expert and novice users to collect and interpret data without background knowledge of the math, physics or underlying computer or computational algorithms to produce result. This provides a more widely usable and commercializable platform to measure and interpret blood flow.

A flexible platform that is agnostic to the type of object producing streaks in the space-time image. The work flow can accurately report velocity of red blood cells using no contrast agents (shown above), with assisted contrast (as in the case of injected fluorescent dye that aids the contrast of blood cells), or can even report the velocity of foreign objects in the blood stream such as injected microbeads or even subtypes of blood cells which may represent different quantifiable populations of velocity that are unique to that object type.

This strategy (to substantially speed up the calculation of the Radon transform) can be applied to any field in which the Radon transform is used to determine the orientation of features in an image. Current strategy is particularly useful when orientation determination needs to be done quickly and robustly on a large dataset in any application which uses the Radon transform. Though we have currently applied our strategy to (quickly) determine velocity of blood cells, the same strategy can also be applied to determine velocity from the space-time image of any moving object (from meteors and cars to dust particles in a fluid).

Below is a list of fields in which the Radon transform is currently used, and where our strategy could potentially find application. This is by no means a comprehensive list, but includes some of the more popular applications of the Radon transform. Numbers in brackets indicate citations to references which immediately follow hereinbelow:

Generic application to orientation determination in any image [1,2]
Particle imaging velocimetry [3,4]
Computed tomography (CT) [5]
Seismic data/fracture analysis [6]
Remote Sensing:
Linear feature (ship wakes etc.) detection in Synthetic Aperture Radar (SAR) images [7,8]
Road identification (centerline, orientation, thickness etc.) in LIDAR images [9,10] Text recognition/document segmentation:
Determination of orientation/skew of text in Optical Character Recognition (OCR) applications [11,12]
Texture/shape classification [13,14]

Analysis of objects on a moving conveyor belt, such as for example, analysis of line scan data from a line scanner imaging objects on a production line.

Analysis of race vehicles on a race track, such as for example analysis of line scan data of race cars passing a line scanner on a race track, such as, for example, at a NASCAR race event.

x-t images from conventional 2D imaging and 2D images: As described hereinabove, raw space-time (x-t images) can also be synthesized from conventional 2D images from conventional cameras and camera images. For example, lines of any suitable pixel width can be extracted from successive 2D images to generate a raw x-t image as raw input data to the new method and system described hereinabove.

Processes, such as software processes and/or processes in firmware to perform the methods described hereinabove can be provided on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES

1. Deans, Stanley R. The Radon transform and some of its applications. Courier Corporation, 2007.
2. Duda, Richard O., and Peter E. Hart. "Use of the Hough Transformation to Detect Lines and Curves in Pictures." Commun. ACM 15, no. 1 (January 1972): 11-15. doi: 10.1145/361237.361242.
3. Drew, Patrick J., Pablo Blinder, Gert Cauwenberghs, Andy Y. Shih, and David Kleinfeld. "Rapid Determination of Particle Velocity from Space-Time Images Using the Radon Transform." Journal of Computational Neuroscience 29, no. 1-2 (May 21, 2009): 5-11. doi:10.1007/s10827-009-0159-1.
4. Kim, Tyson N., Patrick W. Goodwill, Yeni Chen, Steven M. Conolly, Chris B. Schaffer, Dorian Liepmann, and Rong A. Wang. "Line-Scanning Particle Image Velocimetry: An Optical Approach for Quantifying a Wide Range of Blood Flow Speeds in Live Animals." PLoS ONE 7, no. 6 (Jun. 26, 2012). doi:10.1371/journal.pone.0038590.
5. Natterer, Frank. The mathematics of computerized tomography. Society for Industrial and Applied Mathematics, 2001.
6. Yilmaz, Öz. Seismic data analysis: Processing, inversion, and interpretation of seismic data (Chapter 6). Society of exploration geophysicists, 2001.
7. A. C. Copeland, G. Ravichandran, and M. M. Trivedi, "Localized Radon transform-based detection of ship wakes in SAR images," IEEE Trans Geosci. Remote Sens., vol. 33, no. 1, pp. 35-45, January 1995.
8. Murphy, Lesley M. "Linear Feature Detection and Enhancement in Noisy Images via the Radon Transform." Pattern Recognition Letters 4, no. 4 (September 1986): 279-84. doi:10.1016/0167-8655(86)90009-7.
9. S. P. Clode, E. E. Zelniker, P. J. Kootsookos, and I. V. L. Clarkson, "A phase coded disk approach to thick curvilinear line detection," in Proc. 7th Eur. Signal Processing Conf., Vienna, Austria, Sep. 6-10, 2004, pp. 1147-1150.
10. Zhang, Qiaoping, and I. Couloigner. "Comparing Different Localization Approaches of the Radon Transform for Road Centerline Extraction from Classified Satellite Imagery." In 18th International Conference on Pattern Recognition (ICPR'06), 2:138-41, 2006. doi:10.1109/ICPR.2006.389.
11. Aithal, Prakash K., G. Rajesh, Dinesh U. Acharya, and P. C. Siddalingaswamy. "A Fast and Novel Skew Estimation Approach Using Radon Transform." International Journal of Computer Information Systems and Industrial Management Applications 5 (2013): 337-44.
12. Khidir, AbdulSattar M. "Use of Radon Transform in Orientation Estimation of Printed Text." IEEE Computer Society, 2011. http://icit.zuj.edu.jo/icit11/PaperList/Papers/Image%20and%20signal%20Processing/553_abdulsattar.pdf.
13. Jafari-Khouzani, K., and H. Soltanian-Zadeh. "Radon Transform Orientation Estimation for Rotation Invariant Texture Analysis." IEEE Transactions on Pattern Analysis and Machine Intelligence 27, no. 6 (June 2005): 1004-8. doi:10.1109/TPAMI.2005.126.
14. Leavers, V. F. "Use of the Two-Dimensional Radon Transform to Generate a Taxonomy of Shape for the Characterization of Abrasive Powder Particles." IEEE Transactions on Pattern Analysis and Machine Intelligence 22, no. 12 (December 2000): 1411-23. doi:10.1109/34.895975.

Additional references general to the new method and system:

Zhong, Z., Petrig, B. L., Qi, X., and Burns, S. A. (2008). In vivo measurement of erythrocyte velocity and retinal blood flow using adaptive optics scanning laser ophthalmoscopy. Opt Express 16, 12746-12756.

Zhong, Z., Song, H., Chui, T. Y. P., Petrig, B. L., and Burns, S. A. (2011). Noninvasive measurements and analysis of blood velocity profiles in human retinal vessels. Invest. Ophthalmol. Vis. Sci 52, 4151-4157.

Zhong, Z., Huang, G., Chui, T. Y. P., Petrig, B. L., and Burns, S. A. (2012). Local Flicker Stimulation Evokes Local Retinal Blood Velocity Changes. J Vis 12.

Drew P J, Blinder P, Cauwenberghs G, Shih A Y, Kleinfeld D (2010) Rapid determination of particle velocity from space-time images using the Radon transform. J Comput Neurosci 29: 5-11. doi:10.1007/s10827-009-0159-1

What is claimed is:

1. An image processing method for determining and reporting a velocity of a plurality objects in a space-time image comprising:
   providing a camera or a scanning imager to acquire a plurality of images of a line at an image acquisition rate and a computer communicatively coupled to said imager;
   receiving a plurality of images from said imager;
   generating a space-time image from said plurality of images of said line;
   applying a mask to a subset image of said space-time image to provide a masked subset area;
   generating a rotational look up table of intensity values of pixels of columns and rows of said masked subset area, said rotational look up table including intensity values for columns and rows at a plurality of rotational angles;
   generating a radon transform for each subset image based on said rotational look up table;
   computing a velocity of a plurality of objects in said subset image based on said radon transform;
   repeating said step of applying a mask to a subset image of said space-time image to said step of computing a velocity of a plurality of objects in said subset image substantially in parallel at about said image acquisition rate to compute a velocity of a plurality of objects in a plurality of subset images; and
   displaying said velocity of a plurality of objects overlaying said space-time image substantially in real-time as said plurality of images are acquired.

2. The image processing method of claim 1, wherein said step of providing comprises providing a scanning laser apparatus or a scanning line apparatus.

3. The image processing method of claim 1, wherein said step of providing comprises providing a scanning laser ophthalmoscope (SLO).

4. The image processing method of claim 1, wherein said step of providing comprises providing an adaptive optics scanning light ophthalmoscope (AOSLO).

5. The image processing method of claim 1, wherein said step of providing comprises providing a 2D imager with a frame rate, wherein each image of a line of said plurality of images of a line is extracted from each different image of said 2D images prior to generating said space-time image.

6. The image processing method of claim 1, wherein said step of providing comprises providing a multi-threaded CPU comprising a plurality of cores.

7. The image processing method of claim 1, wherein said step of providing comprises providing a GPU adapted for parallel computational processes.

8. The image processing method of claim 1, wherein said step of providing comprises providing images of a retina of a human eye or an animal eye.

9. The image processing method of claim 1, wherein said step of generating a radon transform for each subset image comprises a sum of corresponding elements of rotated columns in said a rotational look up table for each of said plurality of rotational angles.

10. The image processing method of claim 1, wherein said step of computing a velocity of a plurality of objects comprises computing a velocity of a plurality of objects in a plurality of blood vessels.

11. The image processing method of claim 10, wherein said step of computing a velocity of a plurality of objects comprises computing a velocity of a plurality of blood cells.

12. The image processing method of claim 1, wherein said step of computing a velocity of a plurality of objects further comprises calculating a signal to noise ratio (SNR) associated with at least one object velocity to estimate an uncertainty value for said at least one object velocity.

13. The image processing method of claim 1, wherein said step of computing a velocity of a plurality of objects further comprises a data set randomized 1:N ways.

14. The image processing method of claim 1, wherein said step of displaying said velocity of a plurality of objects comprises displaying color coded velocity lines where a color is indicative of a velocity.

15. The image processing method of claim 1, wherein said step of displaying said velocity of a plurality of objects further comprises displaying a histogram of a velocity of said plurality of objects in said space-time image.

16. The image processing method of claim 1, wherein said step of computing a velocity of a plurality of objects comprises a plurality of particles.

17. The image processing method of claim 1, wherein said step of computing a velocity of a plurality of objects comprises a plurality of fractures.

18. The image processing method of claim 1, wherein said step of computing a velocity of a plurality of objects comprises a plurality of an object selected from the group consisting of cars, ships, boats, aircraft, spacecraft, satellites, and vehicles.

19. The image processing method of claim 1, wherein said step of computing a velocity of a plurality of objects comprises a plurality of objects on a conveyor belt.

20. The image processing method of claim 1, wherein said step of computing a velocity of a plurality of objects comprises a plurality of textures or shapes.

21. The image processing method of claim 1, wherein said step of computing a velocity of a plurality of objects comprises a determination of an orientation or skew of a text in an optical character recognition (OCR) application.

* * * * *